United States Patent
McKenney

(10) Patent No.: US 9,183,156 B2
(45) Date of Patent: *Nov. 10, 2015

(54) READ-COPY UPDATE IMPLEMENTATION FOR NON-CACHE-COHERENT SYSTEMS

(71) Applicant: International Business Machines Corporation, Armonk, NY (US)

(72) Inventor: Paul E. McKenney, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/093,186

(22) Filed: Nov. 29, 2013

(65) Prior Publication Data
US 2014/0089596 A1    Mar. 27, 2014

Related U.S. Application Data

(63) Continuation of application No. 13/164,423, filed on Jun. 20, 2011.

(51) Int. Cl.
*G06F 13/00* (2006.01)
*G06F 12/08* (2006.01)

(52) U.S. Cl.
CPC ........ *G06F 12/0891* (2013.01); *G06F 12/0808* (2013.01); *G06F 12/0817* (2013.01)

(58) Field of Classification Search
CPC combination set(s) only.
See application file for complete search history.

(56) References Cited

U.S. PATENT DOCUMENTS

| | | | |
|---|---|---|---|
| 5,442,758 A | 8/1995 | Slingwine et al. | |
| 5,608,893 A | 3/1997 | Slingwine et al. | |
| 5,727,209 A | 3/1998 | Slingwine et al. | |
| 6,219,690 B1 | 4/2001 | Slingwine et al. | |
| 6,662,184 B1 | 12/2003 | Friedberg | |
| 6,886,162 B1 | 4/2005 | McKenney | |
| 6,996,812 B2 | 2/2006 | McKenney | |
| 7,136,969 B1 * | 11/2006 | Niver et al. ............. | 711/141 |
| 7,191,272 B2 | 3/2007 | McKenney | |
| 7,287,135 B2 | 10/2007 | McKenney et al. | |
| 7,349,926 B2 | 3/2008 | McKenney et al. | |
| 7,353,346 B2 | 4/2008 | McKenney et al. | |
| 7,395,263 B2 | 7/2008 | McKenney | |
| 7,395,383 B2 | 7/2008 | McKenney | |
| 7,426,511 B2 | 9/2008 | McKenney | |

(Continued)

OTHER PUBLICATIONS

J. Seigh, "RCU + SMR for preemptive kernel/user threads," Linux Kernel Mailing List, May 9, 2005, 2 pages.

(Continued)

*Primary Examiner* — Charles Rones
*Assistant Examiner* — Han Doan
(74) *Attorney, Agent, or Firm* — Walter W. Duft

(57) ABSTRACT

A technique for implementing read-copy update in a shared-memory computing system having two or more processors operatively coupled to a shared memory and to associated incoherent caches that cache copies of data stored in the memory. According to example embodiments disclosed herein, cacheline information for data that has been rendered obsolete due to a data update being performed by one of the processors is recorded. The recorded cacheline information is communicated to one or more of the other processors. The one or more other processors use the communicated cacheline information to flush the obsolete data from all incoherent caches that may be caching such data.

6 Claims, 12 Drawing Sheets

(56) References Cited

U.S. PATENT DOCUMENTS

| | | |
|---|---|---|
| 7,454,581 B2 | 11/2008 | McKenney et al. |
| 7,472,228 B2 | 12/2008 | McKenney et al. |
| 7,653,791 B2 | 1/2010 | McKenney |
| 7,668,851 B2 | 2/2010 | Triplett |
| 7,689,789 B2 | 3/2010 | McKenney et al. |
| 7,734,879 B2 | 6/2010 | McKenney et al. |
| 7,734,881 B2 | 6/2010 | McKenney et al. |
| 7,747,805 B2 | 6/2010 | McKenney |
| 7,814,082 B2 | 10/2010 | McKenney |
| 7,818,306 B2 | 10/2010 | McKenney et al. |
| 7,873,612 B2 | 1/2011 | McKenney et al. |
| 7,904,436 B2 | 3/2011 | McKenney |
| 7,934,062 B2 | 4/2011 | McKenney et al. |
| 7,953,708 B2 | 5/2011 | McKenney et al. |
| 7,953,778 B2 | 5/2011 | McKenney et al. |
| 2006/0112121 A1 | 5/2006 | McKenney et al. |
| 2006/0117072 A1* | 6/2006 | McKenney et al. ......... 707/201 |
| 2006/0130061 A1 | 6/2006 | Bauer et al. |
| 2006/0265373 A1 | 11/2006 | McKenney et al. |
| 2007/0027870 A1* | 2/2007 | Kim et al. ......... 707/8 |
| 2007/0198520 A1 | 8/2007 | McKenney et al. |
| 2008/0082532 A1 | 4/2008 | McKenney |
| 2008/0140951 A1 | 6/2008 | McKenney et al. |
| 2008/0313238 A1 | 12/2008 | McKenney et al. |
| 2009/0006403 A1 | 1/2009 | McKenney |
| 2009/0077080 A1 | 3/2009 | McKenney |
| 2009/0254764 A1* | 10/2009 | McKenney et al. ......... 713/300 |
| 2010/0023946 A1 | 1/2010 | McKenney |
| 2011/0055183 A1 | 3/2011 | McKenney |

OTHER PUBLICATIONS

M. Michael, "Hazard Pointers: Safe Memory Reclamation for Lock-Free Objects," IEEE Transactions on Parallel and Distributed Systems, Jun. 2004, vol. 15, No. 6, pp. 491-504.

D. Sarma et al., "Making RCU Safe for Deep Sub-Millisecond Response Realtime Applications," 2004 USENIX (UseLinux track) Jun. 2004, 9 pages.

P. McKenney, "RCU vs. Locking Performance on Different CPUs," 2004 Linux.conf.au, 2004, 18 pages.

P. McKenney et al., "Scaling dcache with RCU," Linux Journal, Jan. 1, 2004, 12 pages.

P. McKenney et al., "Using RCU in the LInux 2.5 Kernel," LInux Journal, Oct. 1, 2003, 11 pages.

P. McKenney et al.,"Read-Copy Update," 2002 Ottawa Linux Symposium, Jul. 8, 2002, 28 pages.

H. Lindar et al., "Scalability of the Directory Entry Cache," 2002 Ottawa Linux Symposium, Jun. 26, 2002, pp. 289-300.

P. McKenney et al., "Read-Copy Update," 2001 Ottawa Linux symposium, Jul. 2001, 22 pages.

P. McKenney et al., "Read-Copy Update: Using Execution History to Solve Concurrency Problems," PDCS, Oct. 1998, 11 pages.

S. Dietrich et al., "Evolution of Real-Time Linux," 7th RTL Workshop, Nov. 17, 2005, 18 pages.

B. Gamsa, "Tornado: Maximizing Locality and Concurrency in a Shared Memory Multiprocessor Operating System," 1999, 14 pages.

Molnar et al., "Realtime and Linux," 2005 Linux Kernel Summit, 8 pages.

H. Boehm, "The Space Cost of Lazy Reference Counting," ACM SIGPLAN Notices, Proceedings of the 31st ACM SIGPLAN-SIGACT Symposium on Principles of Programming Languages, POPL '04, vol. 39, Issue 1, Jan. 2004, p. 210-219.

M. Michael, "Scalable Lock-Free Dynamic Memory Allocation," ACM SIGPLAN Notices, Proceedings of the ACM SIGPLAN 2004 Conference on Programming Language Design and Implementation; PLDI '04, vol. 39, Issue 6, Jun. 2004, p. 35-46.

D. Dice et al., "Mostly Lock-Free Malloc," ACM SIGPLAN Notices, Proceedings of the 3rd International Symposium on Memory Management, ISMM '02, vol. 38, Issue 2 Supplement, Jun. 2002, p. 163-174.

J. Corbet, "Read-copy-update for realtime," LWN.net, Sep. 26, 2006, 3 pages.

McKenney, "Seven real-time Linux approaches (Part C)", LinuxDevices.com, Jun. 7, 2005, 13 pages.

P. McKenney, "RCU and CONFIG_PREEMPT_RT progress," Linux Kernel Mailing List, May 9, 2005, 2 pages.

O. Nesterov, QRCU: 'Quick' SRCU Implementation, Linux Kernel Mailing List, Dec. 1, 2005, 3 pages.

P. McKenney, "Sleepable RCU", LWN.net, Oct. 9, 2006, 10 pages.

P. McKenney, "Read-Copy Update Implementations", 2001, 3 pages.

M. Herlihy, "A Methodology for Implementing Highly Concurrent Data Objects," ACM Transactions on Programming Languages and Systems, vol. 15, Issue 5, Nov. 1993, pp. 745-770.

M. Michael, "Safe Memory Reclamation for Dynamic Lock-Free Objects Using Atomic Reads and Writes," Proceedings of the 21st Annual ACM Symposium on Principles of Distributed Computing, Jul. 2002, 10 pages.

N. Barghouti et al., "Concurrency Control in Advanced Database Operations," Jan. 1994, 83 pages.

P. McKenney, "Exploiting Deferred Destruction: An Analysis of Read-Copy-Update Techniques in Operating System Kernels," OGI School of School of Science & Engineering at Oregon Health & Science University, Jul. 2004, pp. 1-380.

P. McKenney et al., "Extending RCU for Realtime and Embedded Workloads," 2006 Ottawa Linux Symposium, Aug. 11, 2006, 15 pages.

P. McKenney, "The design of preemptible read-copy-update," LWN.net, Oct. 8, 2007, 27 pages.

P. McKenney, "Integrating and Validating dynticks and Preemptible RCU," LWN.net, Apr. 22, 2008, 19 pages.

P. McKenney, "Hierarchical RCU," LWN.net, Nov. 4, 2008, 19 pages.

P. McKenney, "Is Parallel Programming Hard, and, If So, What Can You Do About It", Mar. 8, 2009, 146 pages.

P. McKenney, "Priority-Boosting RCU Read-Side Critical Sections," LWN.net, Feb. 5, 2007, 15 pages.

P. McKenney et al., "Towards hard realtime response from the Linux kernel on SMP hardware," linux.conf.au, Canberra, Australia, Apr. 2005, 16 pages.

P. McKenney et al., "Exploiting Deferred Destruction: An Analysis of Read-Copy-Update Techniques in Operating System Kernels", Jan. 3, 2005, pp. 1-41.

D. Guniguntala et al., "The read-copy-update mechanism for supporting real-time applications on shared-memory multiprocessor systems with Linux", IBM Systems Journal vol. 47 No. 2, 2008, pp. 221-236.

P. McKenney, "Introducing Technology Into Linux", 2008 Linux Developer Symposium, China, 2008, 47 pages.

P. McKenney, "Simplicity Through Optimization", linux.conf.au, Jan. 2010, 109 pages.

P. McKenney, "Deterministic Synchronization in Multicore Systems: the Role of RCU", Aug. 18, 2009, pp. 1-9.

P. McKenney, "RCU cleanups and simplified preemptable RCU", LKML.org, Jul. 23, 2009, 1 page.

P. McKenney, "Expedited "big hammer" RCU grace periods", LKML.org, Jun. 25, 2009, 2 pages.

P. McKenney, "RCU: The Bloatwatch Edition", LWN.net, Mar. 17, 2009, 9 pages.

M. Desnoyers, "Low-Impact Operating System Tracing", University of Montreal, PhD Thesis, Dec. 2009, 233 pages.

P. McKenney, "Using a Malicious User-Level RCU to Torture RCU-Based Algorithms", linux.conf.au, Jan. 2009, 51 pages.

P. McKenney et al., "Introducing Technology Into the Linux Kernel: A Case Study", Operating Systems Review, Jul. 2008, 16 pages.

P. McKenney, "What is RCU, Fundamentally", LWN.net, Dec. 17, 2007, 15 pages.

(56) References Cited

OTHER PUBLICATIONS

P. McKenney, What is RCU? Part 2: Usage, LWN.net, Dec. 24, 2007, 15 pages.

P. McKenney, RCU part 3: the RCU API, LWN.net, Jan. 7, 2008, 7 pages.

T. Hart et al., "Performance of memory reclamation for lockless synchronization", Journal of Parallel and Distributed Computing, Dec. 2007, pp. 1270-1285.

McKenney, "Using Promela and Spin to verify parallel algorithms", LWN.net, Aug. 1, 2007, 11 pages.

McKenney, "RCU and Unloadable Modules", LWN.net, Jan. 14, 2007, 4 pages.

P. Zijlstra, "[PATCH] slab: document SLAB_DESTROY_BY_RCU", LKML.org, Nov. 13, 2008, 1 page.

A. Arcangeli et al., "Using Read-Copy-Update Techniques for System V IPC in the Linux 2.5 Kernel," 2003 FREENIX, Jun. 14, 2003, 13 pages.

P. Gerum, "/linux/arch/blackfin/mach-bf561/atomic.S", Linux v.2.6. 39, Jan. 1, 2007, 14 pages.

"linux/arch/blackin/include/asm/cache.h", Linux v.2.6.39, Jan. 1, 2004, 2 pages.

T. Kou, "linux/arch/blackfin/include/asm/system.h", Linux v.2.6.39, Jan. 1, 2004, 3 pages.

D. Sarma, "linux/include/linux/rcupdate.h", Linux v. 2.6.39, Jan. 1, 2001, 12 pages.

\* cited by examiner

READ-COPY UPDATE IMPLEMENTATION FOR NON-CACHE-COHERENT SYSTEMS

This application is a continuation under 35 U.S.C. 120 of application Ser. No. 13/164,423, filed Jun. 20, 2011, entitled "Read-Copy Update Implementation For Non-Cache-Coherent Systems."

BACKGROUND

1. Field

The present disclosure relates to computer systems and methods in which data resources are shared among data consumers while preserving data integrity and consistency relative to each consumer. More particularly, the disclosure concerns an implementation of a mutual exclusion mechanism known as "read-copy update" in a cache-incoherent shared-memory computing environment.

2. Description of the Prior Art

By way of background, read-copy update (also known as "RCU") is a mutual exclusion technique that permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The technique is well suited to both uniprocessor and multiprocessor computing environments wherein the number of read operations (readers) accessing a shared data set is large in comparison to the number of update operations (updaters), and wherein the overhead cost of employing other mutual exclusion techniques (such as locks) for each read operation would be high. By way of example, a network routing table that is updated at most once every few minutes but searched many thousands of times per second is a case where read-side lock acquisition would be quite burdensome.

The read-copy update technique implements data updates in two phases. In the first (initial update) phase, the actual data update is carried out in a manner that temporarily preserves two views of the data being updated. One view is the old (pre-update) data state that is maintained for the benefit of read operations that may have been referencing the data concurrently with the update. The other view is the new (post-update) data state that is seen by operations that access the data following the update. In the second (deferred update) phase, the old data state is removed following a "grace period" that is long enough to ensure that the first group of read operations will no longer maintain references to the pre-update data. The second-phase update operation typically comprises freeing a stale data element to reclaim its memory. In certain RCU implementations, the second-phase update operation may comprise something else, such as changing an operational state according to the first-phase update.

FIGS. 1A-1D illustrate the use of read-copy update to modify a data element B in a group of data elements A, B and C. The data elements A, B, and C are arranged in a singly-linked list that is traversed in acyclic fashion, with each element containing a pointer to a next element in the list (or a NULL pointer for the last element) in addition to storing some item of data. A global pointer (not shown) is assumed to point to data element A, the first member of the list. Persons skilled in the art will appreciate that the data elements A, B and C can be implemented using any of a variety of conventional programming constructs, including but not limited to, data structures defined by C-language "struct" variables. Moreover, the list itself is a type of data structure.

It is assumed that the data element list of FIGS. 1A-1D is traversed (without locking) by multiple readers and occasionally updated by updaters that delete, insert or modify data elements in the list. In FIG. 1A, the data element B is being referenced by a reader r1, as shown by the vertical arrow below the data element. In FIG. 1B, an updater u1 wishes to update the linked list by modifying data element B. Instead of simply updating this data element without regard to the fact that r1 is referencing it (which might crash r1), u1 preserves B while generating an updated version thereof (shown in FIG. 1C as data element B') and inserting it into the linked list. This is done by u1 acquiring an appropriate lock (to exclude other updaters), allocating new memory for B', copying the contents of B to B', modifying B' as needed, updating the pointer from A to B so that it points to B', and releasing the lock. In current versions of the Linux® kernel, pointer updates performed by updaters can be implemented using the rcu_assign_pointer( ) primitive. As an alternative to locking during the update operation, other techniques such as non-blocking synchronization or a designated update thread could be used to serialize data updates. All subsequent (post update) readers that traverse the linked list, such as the reader r2, will see the effect of the update operation by encountering B' as they dereference B's pointer. On the other hand, the old reader r1 will be unaffected because the original version of B and its pointer to C are retained. Although r1 will now be reading stale data, there are many cases where this can be tolerated, such as when data elements track the state of components external to the computer system (e.g., network connectivity) and must tolerate old data because of communication delays. In current versions of the Linux® kernel, pointer dereferences performed by readers can be implemented using the rcu_dereference( ) primitive.

At some subsequent time following the update, r1 will have continued its traversal of the linked list and moved its reference off of B. In addition, there will be a time at which no other reader process is entitled to access B. It is at this point, representing an expiration of the grace period referred to above, that u1 can free B, as shown in FIG. 1D.

FIGS. 2A-2C illustrate the use of read-copy update to delete a data element B in a singly-linked list of data elements A, B and C. As shown in FIG. 2A, a reader r1 is assumed be currently referencing B and an updater u1 wishes to delete B. As shown in FIG. 2B, the updater u1 updates the pointer from A to B so that A now points to C. In this way, r1 is not disturbed but a subsequent reader r2 sees the effect of the deletion. As shown in FIG. 2C, r1 will subsequently move its reference off of B, allowing B to be freed following the expiration of a grace period.

In the context of the read-copy update mechanism, a grace period represents the point at which all running tasks (e.g., processes, threads or other work) having access to a data element guarded by read-copy update have passed through a "quiescent state" in which they can no longer maintain references to the data element, assert locks thereon, or make any assumptions about data element state. By convention, for operating system kernel code paths, a context switch, an idle loop, and user mode execution all represent quiescent states for any given CPU running non-preemptible code (as can other operations that will not be listed here). The reason for this is that a non-preemptible kernel will always complete a particular operation (e.g., servicing a system call while running in process context) prior to a context switch.

In FIG. 3, four tasks 0, 1, 2, and 3 running on four separate CPUs are shown to pass periodically through quiescent states (represented by the double vertical bars). The grace period (shown by the dotted vertical lines) encompasses the time frame in which all four tasks that began before the start of the grace period have passed through one quiescent state. If the four tasks 0, 1, 2, and 3 were reader tasks traversing the linked lists of FIGS. 1A-1D or FIGS. 2A-2C, none of these tasks having reference to the old data element B prior to the grace period could maintain a reference thereto following the grace period. All post grace period searches conducted by these tasks would bypass B by following the updated pointers created by the updater.

Grace periods may be synchronous or asynchronous. According to the synchronous technique (e.g., using the synchronize_rcu( ) primitive), an updater performs the first phase update operation, blocks (waits) until the grace period has completed, and then implements the second phase update operation, such as by removing stale data. According to the asynchronous technique (e.g., using the call_rcu( ) primitive), an updater performs the first phase update operation, then specifies the second phase update operation as a callback, and thereafter resumes other processing with the knowledge that the callback will eventually be processed at the end of a grace period. Advantageously, callbacks requested by one or more updaters can be batched (e.g., on callback lists) and processed as a group at the end of the grace period. This allows grace period overhead to be amortized over plural deferred update operations.

Multiprocessor RCU implementations developed to date assume that the underlying hardware system offers cache-coherence and one of a range of memory-ordering models (i.e., from strongly ordered to weakly ordered). However, there have been recent concerns, particularly among vendors offering strongly ordered systems, that cache-incoherent systems will be required in order to continue progress according to Moore's Law. Whether or not these concerns have any basis in reality, shared-memory cache-incoherent systems are starting to appear. In some cases, all caches in the system are incoherent. In other cases, the system may have cache-coherent multi-processor "nodes" within a larger cache-incoherent system. In such systems, cache coherence is maintained with respect to a node's local memory but not with respect to the memory of other nodes. Although there has been some work extending RCU to shared-nothing systems (i.e., clusters), there has been very little work towards efficient RCU implementations in cache-incoherent shared-memory multiprocessor systems. One of the challenges facing RCU in a cache-incoherent shared-memory environment is the need to accommodate the reuse of memory blocks by updaters. Such reuse can occur, for example, when a memory block associated with stale data is reclaimed at the end of a grace period and then subsequently reused for storing new data. If the memory block is reused before the cachelines containing the stale data are removed from local processor caches, readers dereferencing pointers that should point to the new data may in fact retrieve the old stale data.

One prior-art approach for solving this problem, used in the Blackfin® system from Analog Devices, Inc., is to have the rcu_dereference( ) primitive flush all lines from the executing processor's cache. See Linux® v.2.6.39 source code—SSYNC( ) instruction at line 163 of _raw_smp_check_barrier_asm( ) function spanning lines 136-183 of /linux/arch/blackfin/mach-bf561/atomic.S, which is called from smp_check_barrier( ) function spanning lines 59-62 of /linux/arch/blackfin/include/asm/cache.h, which is called from read barrier depends( ) function at line 44 of /linux/arch/blackfin/include/asm/system.h, which is called from "rcu_dereference check( )" spanning lines 327-334 of linux/include/linux/rcupdate.h, which is implemented by rcu_deference( ) at line 519 of linux/include/linux/rcupdate.h. Unfortunately, this approach imposes great overhead on the RCU readers that invoke this primitive, defeating much of the purpose of using RCU in the first place. These developments therefore motivate an RCU implementation that can run efficiently on cache-incoherent systems.

SUMMARY

A method, system and computer program product are provided for implementing read-copy update in a shared-memory computing system having two or more processors operatively coupled to a shared memory and to associated incoherent caches that cache copies of data stored in the memory. According to an example embodiment disclosed herein, cacheline information for data that has been rendered obsolete due to a data update being performed by one of the processors is recorded. The recorded cacheline information is communicated to one or more of the other processors. The one or more other processors use the communicated cacheline information to flush the obsolete data from all incoherent caches that may be caching such data.

According to a further embodiment, the recording operation may comprise an updater determining an extent of the obsolete data in the memory during an update operation to identify cachelines that hold such data, and storing the cacheline information either during or after the update operation in a local cache record data structure associated with a processor that is performing the recording operation. According to another embodiment, the local cache record data structure may use one of a non-compression storage technique or a compression storage technique to store the cacheline information. According to another embodiment, the communicate operation may include merging the cacheline information from the local cache record data structure into a global cache record data structure that stores cacheline information merged from two or more local cache record data structures. According to another embodiment, the cacheline information from the local cache record data structure may be merged into the global cache record data structure through a hierarchy of one or more intermediate cache record data structures. According to another embodiment, the flush operation may comprise using the cacheline information stored in the global cache record data structure to identify and flush the obsolete data from all incoherent caches. According to another embodiment, the communicate and flush operations may be respectively performed during first and second grace period phases by each of processor, or by one or more proxy processors that perform such operations on behalf of other processors.

BRIEF DESCRIPTION OF THE DRAWINGS

The foregoing and other features and advantages will be apparent from the following more particular description of example embodiments, as illustrated in the accompanying Drawings, in which.

DETAILED DESCRIPTION OF EXAMPLE EMBODIMENTS

Introduction

RCU is a way of deferring execution until potentially conflicting actions have completed. As such, RCU's two fundamental guarantees are as follows:

1. Any RCU read-side critical section that begins before a given grace period must end before that grace period ends; and 2. Any dereference of an RCU-protected pointer is guaranteed to see the effects of all initialization carried out before that pointer was published (e.g., via rcu_assign_pointer( )).

It is desirable that an RCU implementation for cache-incoherent systems preserve the above guarantees. In addition, RCU read-side primitives will preferably have low overhead and support multiprocessor scalability. The present disclosure proposes a technique that allows RCU to be used in a cache-incoherent system while supporting the foregoing guarantees and desiderata. It does this by having updaters account for cached data that is obsoleted by updates so that such data can be flushed from each incoherent cache that is accessible to readers prior to ending a grace period. According to example embodiments described in more detail below, the foregoing may be achieved by the following operations:

1. Record—An updater (e.g., via the rcu_assign_pointer( ) primitive) records the extent of a newly obsoleted structure that results from a pointer reassignment stemming from the update. Normally, this can be done by considering the old pointer value and the size of the element that it references (for example, using the sizeof( ) operator in the C programming language), but in other cases may require additional actions;

2. Communicate—At the time of the next interaction with RCU's grace-period machinery, the aggregate address ranges of all of data structures obsoleted by one or more recent update operations (e.g., via one or more invocations of the rcu_assign_pointer( ) primitive) are communicated to the rest of the cache-incoherent shared-memory system; and 3. Flush—A given invocation of synchronous grace period detection (e.g., via the synchronize_rcu( ) primitive) or asynchronous grace period detection (e.g., via the call_rcu( ) primitive) will not return until the aggregate address ranges of data structures obsoleted by all prior updater invocations have been flushed from the incoherent caches of all processors in the cache-incoherent shared-memory system.

There are a number of options for implementing the foregoing operations. Each will be described in more detail below in the "Example Embodiments" section.

Example Embodiments

Figure 1A:
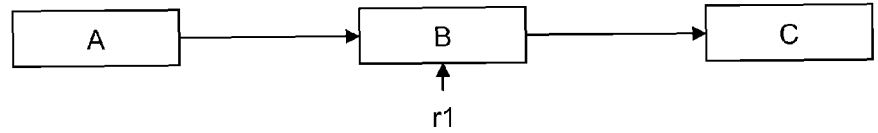
FIGS. 1A-1D are diagrammatic representations of a linked list of data elements undergoing a data element replacement according to a conventional read-copy update mechanism.
Figure 1B:
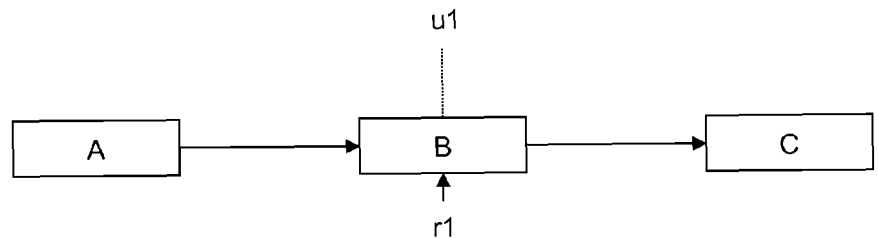
Figure 1C:
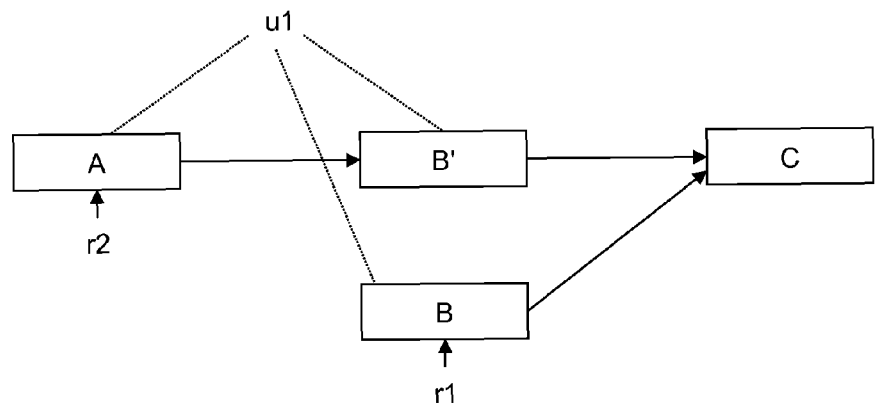
Figure 1D:
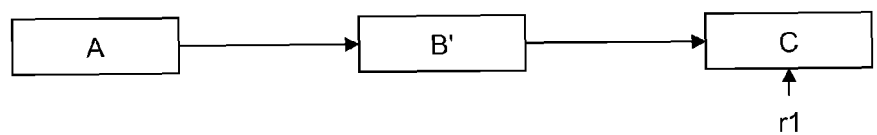
Figure 2A:
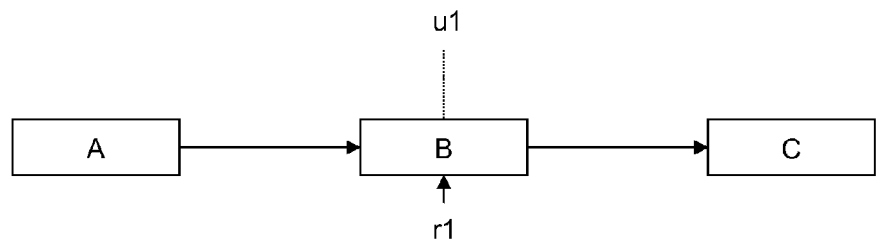
FIGS. 2A-2C are diagrammatic representations of a linked list of data elements undergoing a data element deletion according to a conventional read-copy update mechanism.
Figure 2B:
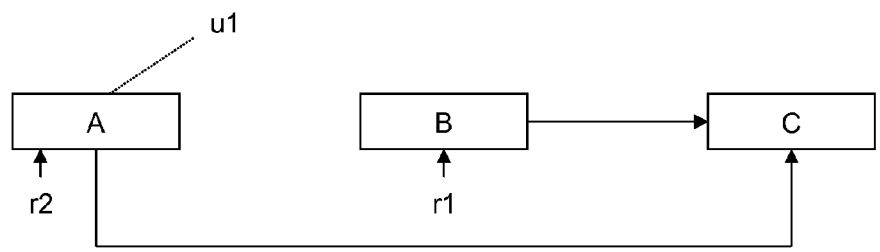
Figure 2C:
Figure 3:
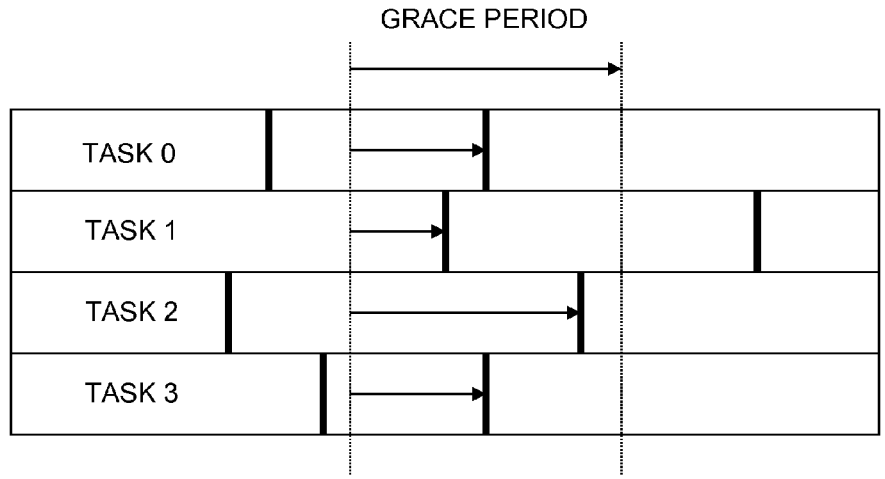
FIG. 3 is a flow diagram illustrating a grace period in which four tasks pass through a quiescent state.
Figure 4:
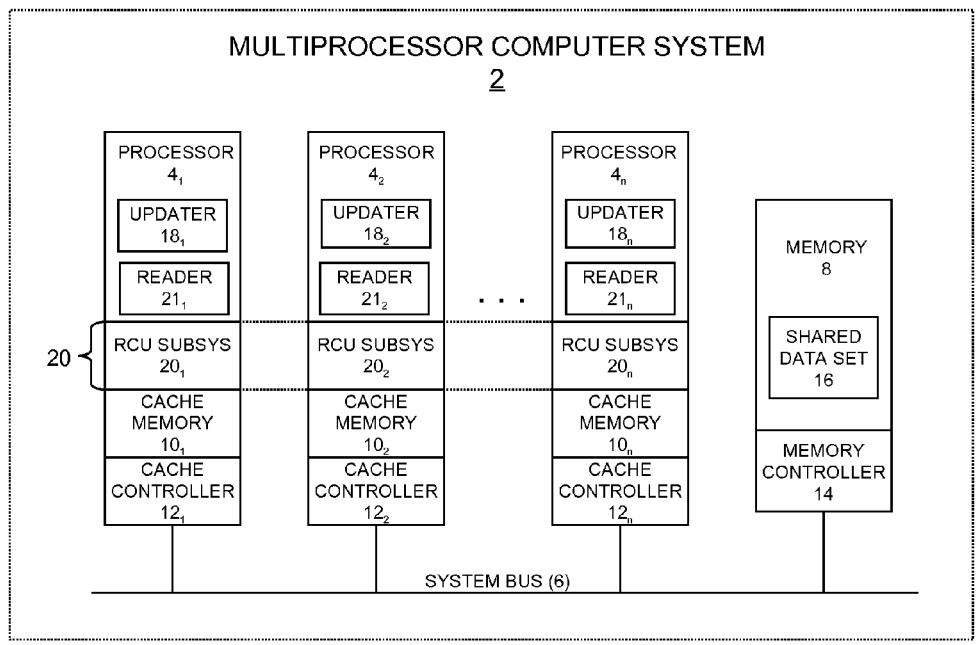
FIG. 4 is a functional block diagram showing an example multiprocessor computing system that may be used to implement the read-copy update technique disclosed herein.

Turning now to the figures, wherein like reference numerals represent like elements in all of the several views, FIG. 4 illustrates an example computing environment in which the grace period processing technique described herein may be implemented. In FIG. 4, a computing system 2 includes two or more processors $4_1, 4_2 \ldots 4_n$, a system bus 6, and a program (main) memory 8. There are also cache memories $10_1, 10_2 \ldots 10_n$ and cache controllers $12_1, 12_2 \ldots 12_n$ respectively associated with the processors $4_1, 4_2 \ldots 4_n$. A conventional memory controller 14 is associated with the memory 8. As shown, the memory controller 14 may reside separately from processors $4_2 \ldots 4_n$ (e.g., as part of a chipset). Alternatively, the memory controller 14 could be provided by plural memory controller instances respectively integrated with the processors $4_2 \ldots 4_n$ (as is known in the art).

The computing system 2 may represent any type of computing apparatus, including but not limited to, general purpose computers, special purpose computers, portable computing devices, communication and/or media player devices, set-top devices, embedded systems, to name but a few. The processors $4_1, 4_2 \ldots 4_n$ may each be a single-core CPU device. Alternatively, the processors $4_1, 4_2 \ldots 4_n$ could represent individual cores within a multi-core CPU device. The processors $4_1, 4_2 \ldots 4_n$ could also be situated within a node of a distributed multi-node system (e.g., as part of a NUMA system, a cluster, a cloud, etc.).

In some embodiments, the cache controllers $12_1, 12_2 \ldots 12_n$ will be cache-incoherent relative to the memory 8. As such, they will not support hardware-implemented memory consistency between the memory 8 and the cache's $10_1, 10_2 \ldots 10_n$. In other cases, such as in multi-node NUMA embodiments, the memory 8 may be a local node memory and the cache controllers $12_1, 12_2 \ldots 12_n$ may support cache-coherency relative to that memory. As shown in the alternative computing system 2A of FIG. 4A, a separate directory cache 17 within a node may be used to cache data stored in the local memory of other nodes, but will do so on a cache-incoherent basis.

Figure 4A:
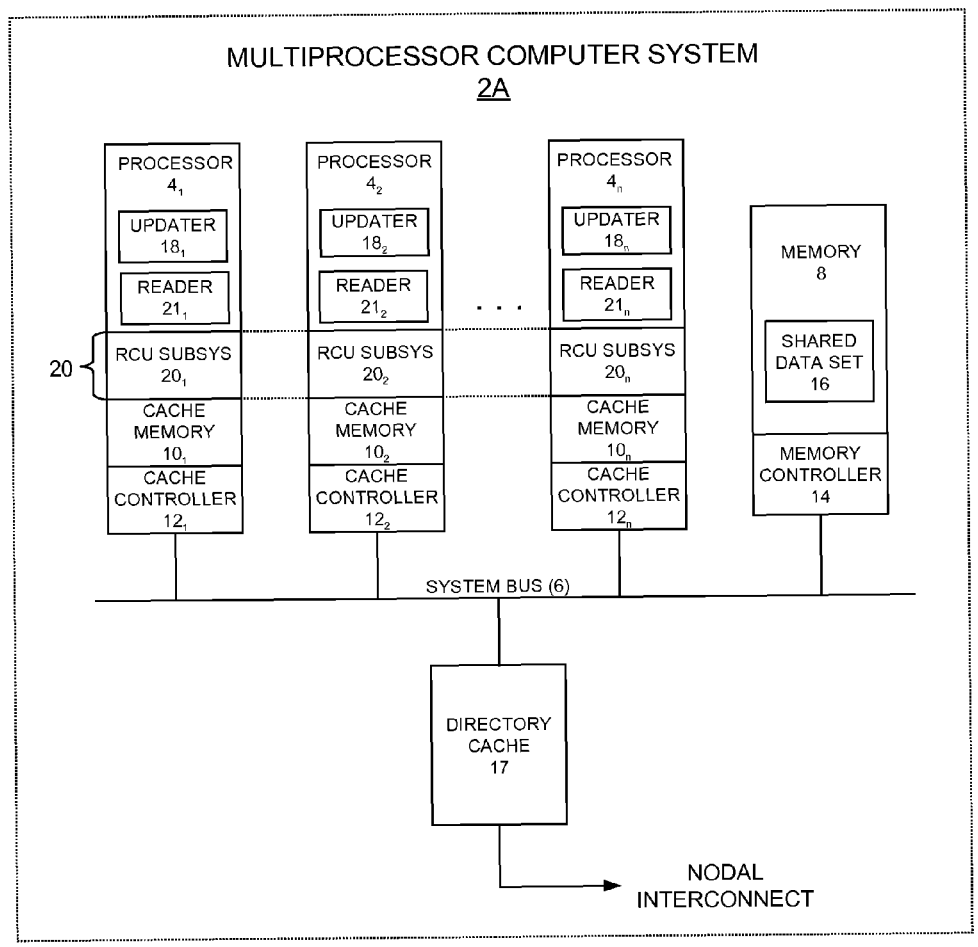
FIG. 4A is a functional block diagram showing another example multiprocessor computing system that may be used to implement the read-copy update technique disclosed herein.

Each CPU device embodied by any given processor 4 of FIGS. 4 and 4A is operable to execute program instruction logic under the control of a software program stored in the memory 8 (or elsewhere). The memory 8 may comprise any type of tangible storage medium capable of storing data in computer readable form, including but not limited to, any of various types of random access memory (RAM), various flavors of programmable read-only memory (PROM) (such as flash memory), and other types of primary storage.

An update operation (updater) 18 may periodically execute within a process, thread, or other execution context (hereinafter "task") on any processor 4 of FIG. 4 or 4A. Each updater 18 runs from program instructions stored in the memory 8 (or elsewhere) in order to periodically perform updates on a set of shared data 16 that may be stored in the shared memory 8 (or elsewhere). Reference numerals $18_1$, $18_2$ ... $18_n$ illustrate individual data updaters that may periodically execute on the several processors $4_1$, $4_2$ ... $4_n$. As described in the "Background" section above, the updates performed by an RCU updater can include modifying elements of a linked list, inserting new elements into the list, deleting elements from the list, and other types of operations. To facilitate such updates, the processors 4 of FIGS. 4 and 4A are programmed from instructions stored in the memory 8 (or elsewhere) to implement a read-copy update (RCU) subsystem 20 as part of their processor functions. Reference numbers $20_1$, $20_2$ ... $20_n$ represent individual RCU instances that may periodically execute on the several processors $4_1$, $4_2$ ... $4_n$. Any given processor 4 in FIGS. 4 and 4A may also periodically execute a read operation (reader) 21. Each reader 21 runs from program instructions stored in the memory 8 (or elsewhere) in order to periodically perform read operations on the set of shared data 16 stored in the shared memory 8 (or elsewhere). Reference numerals $21_1$, $21_2$ ... $21_n$ illustrate individual reader instances that may periodically execute on the several processors $4_1$, $4_2$ ... $4_n$. Such read operations will typically be performed far more often than updates, this being one of the premises underlying the use of read-copy update. Moreover, it is possible for several of the readers 21 to maintain simultaneous references to one of the shared data elements 16 while an updater 18 updates the same data element. The updaters 18, the RCU subsystem 20, and the readers 21 may run either in operating system code paths or in user application code paths (e.g., in a multi-threaded user application).

During run time, an updater 18 will occasionally perform an update to one of the shared data elements 16 (e.g., using the rcu_assign_pointer( ) primitive). In accordance the philosophy of RCU, a first-phase update is performed in a manner that temporarily preserves a pre-update view of the shared data element for the benefit of readers 21 that may be concurrently referencing the shared data element during the update operation. Following the first-phase update, the updater 18 may register a callback with the RCU subsystem 20 for the deferred destruction of the pre-update view following a grace period (second-phase update). As described in the "Background" section above, this is known as an asynchronous grace period. Alternatively, an updater 18 may perform an update, request a synchronous grace period, and block until the synchronous grace period has elapsed.

Figure 5:
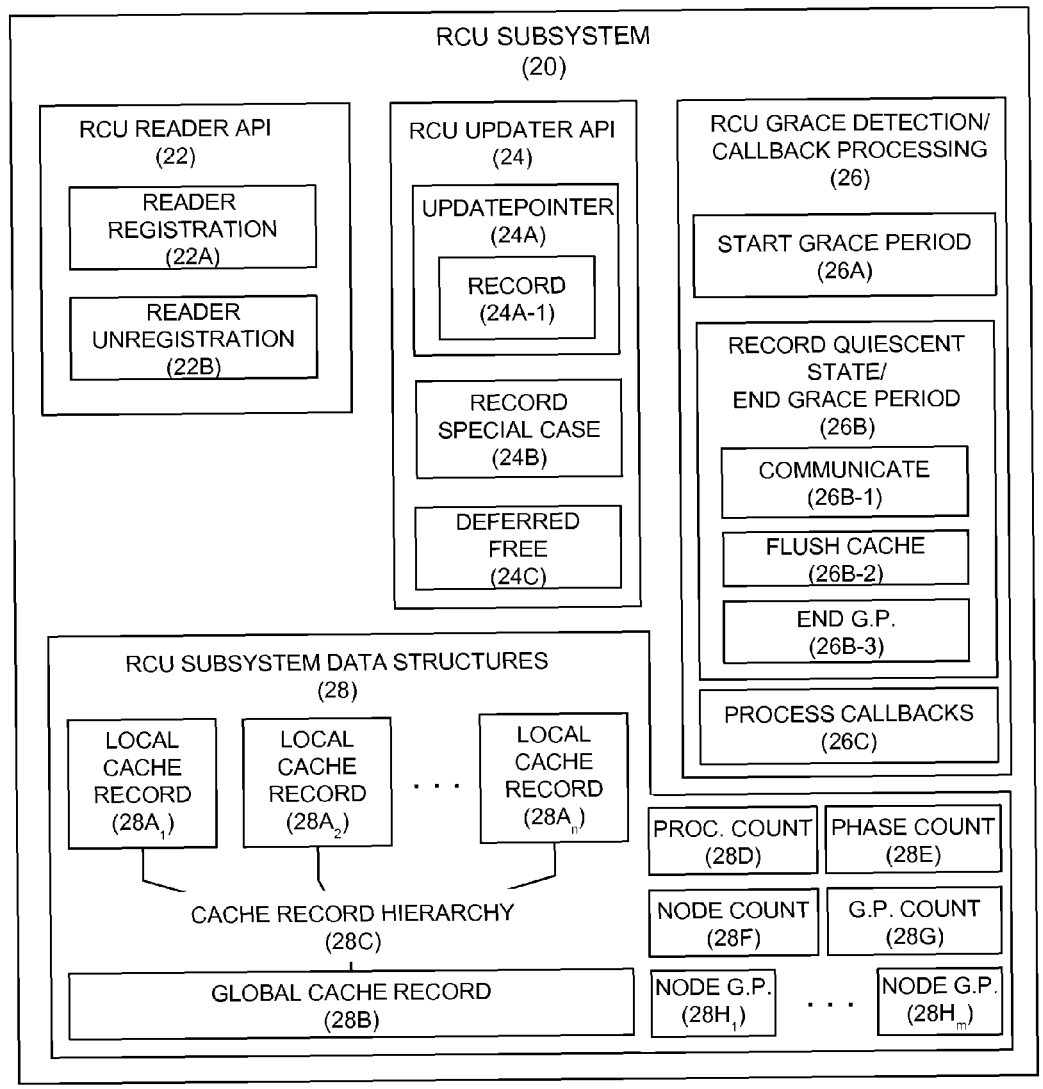
FIG. 5 is a functional block diagram showing an RCU subsystem that may be provided in the computer systems of FIGS. 4 and 4A.

The RCU subsystem 20 may be designed to handle asynchronous grace periods, synchronous grace periods, or both. Grace period processing operations may be performed by periodically running the RCU subsystem 20 on each of the several processors $4_1$, $4_2$ ... $4_n$. Example components of the RCU subsystem 20 are shown in FIG. 5. These components include an RCU reader API (Application Programming Interface) 22, an RCU updater API 24, a set of grace period detection and callback processing functions 26, and a set of RCU subsystem data structures 28.

The RCU reader API 22 is conventional in nature and may include a standard reader registration component 22A and a standard reader unregistration component 22B. The reader registration component 22A is called by readers 21 each time they enter an RCU read-side critical section. In an example embodiment, a function name such as "rcu_read_lock( )" may be used when coding the RCU reader registration component 42A in software. This function performs an action (such as incrementing a counter) that indicates to the RCU subsystem 20 that the reader is in an RCU read-side critical section. The reader unregistration component 22B is called by readers 21 each time they leave an RCU read-side critical section. In an example embodiment, a function name such as "rcu_read_unlock( )" may be used when coding the RCU reader unregistration component 42B in software. This function performs an action (such as decrementing a counter) that indicates to the RCU subsystem 20 that the reader has left its RCU read-side critical section.

The RCU updater API 24 includes a pointer update component 24A, a record special case component 24B, and a deferred free component 24C. The update pointer component 24A may be used by updaters 18 at the end of a first-phase RCU update operation (e.g., data structure modification, deletion, and insertion, etc.) to enable new readers to reference the updated data (e.g., using the rcu_dereference pointer( ) primitive). A function name such as "rcu_assign_pointer( )" may be used when coding the pointer update component 24A in software insofar as this component includes the same pointer update logic found in the conventional RCU rcu_assign_pointer( ) primitive. In addition, however, the update pointer component 24A includes a record sub-component 24A-1 whose purpose is to perform the record operation mentioned in the "Introduction" section above in which the extent of a newly obsoleted data structure is recorded. As part of the record operation, the cacheline(s) used to store the obsoleted data structure (cacheline information) must be determined. In the simple case, the record sub-component 24A-1 may ascertain this information using the old pointer being updated and the size of the structure that it references (e.g. using the sizeof( ) C language operator. However, there are a number of complications that can arise:
 1. The obsoleted structure might have variable length;
 2. The obsoleted structure might be a linked list;
 3. The obsoleted structure might be a multilinked graph;
 4. the obsoleted structure might be only a portion of a larger linked list or graph.

The first case can be easily handled by the record sub-component 24A-1, which may be implemented as part of an updater's update operation. The second and third cases can be handled automatically in languages providing reflection. The last case may require either programmer assistance or a garbage collector that scans a heap region of the memory 8 for orphaned data objects. In the absence of a garbage collector, the programmer would usually be required to traverse the structure in order to free the individual data elements. Therefore, one solution is to require the programmer to traverse the data structure to be freed during a data update and before starting a grace period, and invoking a new API (the record special case component 24B) following the update to record which structures require cache flushing. Example operations of both the record sub-component 24A-1 and the record special case component 24B are described in more detail below.

The deferred free component 24C may be implemented as a suite of conventional RCU primitives that allow an updater to use either asynchronous or synchronous grace periods to facilitate the deferred freeing of memory holding stale data. For asynchronous grace periods, the call_rcu( ), call_rcu_bh( ) and call_rcu_sched( ) primitives represent example functions that may be provided by the deferred free component 24C. For synchronous grace periods, the synchronize_ rcu( ), synchronize_rcu_bh( ) and synchronize_rcu_sched( ) primitives represents additional example functions that may be used.

The RCU grace period detection/callback processing functions 26 include several components that support the operations described herein, including a start grace period component 26A and a record quiescent state/end grace period component 26B. If asynchronous grace periods are supported, a process callbacks component 26C may also be provided. As its name implies, the start grace period component 26A is used to begin new grace periods. If asynchronous grace periods are supported, the presence of a pending callback, or some threshold number of pending callbacks, or one or more pending callbacks plus some other condition (e.g., low memory), etc., could trigger a new grace period. If synchronous grace periods are supported, an explicit request by an updater 18 could trigger a new grace period. When a new grace period starts, the start grace period component 26A may advance a grace period counter and perform other initialization actions that signify to all of the processors $4_1, 4_2 \ldots 4_n$ that a new grace period has started. As will be described in more detail below, the start grace period component 26A may also be used to initialize data structures and variables used for the communicate operation mentioned in the "Introduction" section above.

As its name implies, the record quiescent state/end grace period component 26B is used to track processor quiescent states and end a grace period when it is appropriate to do so. As will be described in more detail below, the record quiescent state/end grace period component 26B may also be used to implement the communicate and flush operations mentioned in the "Introduction" section above. The record quiescent state/end grace period component 26B may thus include three sub-components, namely, a communicate sub-component 26B-1, a flush cache sub-component 26B-2, and an end grace period component 26B-3. Example operations of these sub-components will be described in more detail below.

The process callbacks component 26C is conventional in nature and will not be described further herein. Its purpose is to invoke callbacks as they become ready for processing at the end of a grace period. As is known, such callbacks may be accumulated on callback lists that are each associated with a particular grace period. Callbacks that are ripe for processing because their associated grace period has ended are invoked by the process callbacks component 26C. If desired, such processing may be performed in a separate context from the remainder of the RCU subsystem 20, such as in bottom half context (e.g. softirq context) or in the context of a separate kernel thread (e.g., kthread).

The RCU subsystem data structures 28 may include a set of local cache record data structures $28A_1, 28A_2 \ldots 28A_n$. For operating system kernel implementations of the RCU subsystem 20, the local cache record data structures $28A_1, 28A_2 \ldots 28A_n$ may be implemented as per-processor data structures, or alternatively as per-node data structures in systems comprising multi-processor nodes. Simple numeric-based assignment relationships between the processors $4_1, 4_2 \ldots 4_n$ and the local cache record data structures $28A_1, 28A_2 \ldots 28A_n$ could also be used, such as two processors per data structure, three processors per data structure, etc. In user-level implementations of the RCU subsystem 20, the local cache record data structures $28A_1, 28A_2 \ldots 28A_n$ could replicated on a per-thread basis or in any other suitable manner.

The local cache record data structures $28A_1, 28A_2 \ldots 28A_n$ are used during the record operation by updaters 18 executing on the various processors $4_1, 4_2 \ldots 4_n$. They store cacheline information specifying the cacheline(s) that contain data that has been rendered obsolete due to update operations performed by the updaters $18_1, 18_2 \ldots 18_n$. The manner in which the local cache record data structures $28A_1, 28A_2 \ldots 28A_n$ are implemented depends on the format in which the cacheline information is to be stored.

One approach is to implement each local cache record data structure 28A as a bitmap, with one bit for each cacheline in the system. The record operation may then be performed by setting appropriate bits in one of the local cache record data structures 28A. Subsequently, such bits would be cleared during the communicate operation. This approach is straightforward and has very predictable storage requirements that depend on the size of main memory, the number of bytes in each cache line, and the number of local cache record data structures $28A_1, 28A_2 \ldots 28A_n$ that are provided. For example, assuming the local cache record data structures $28A_1, 28A_2 \ldots 28A_n$ are implemented on a per-processor basis, the total amount of memory consumed by the bitmaps is given by equation (1) below. In equation (1), B is the bitmap memory size, N is the number of processors, M is the number of bytes of available memory across the whole system, and C is the number of bytes in each cache line. It is also assumed that there are eight bits per byte:

$$B = NM/8C \text{ bytes} \qquad (1)$$

From equation (1), the amount of bit map memory required for an individual B, can be expressed as a fraction of the total amount of bit map memory B divided by the number of processors, as shown in equation (2):

$$B_i = B/N = M/8C \text{ bytes/processor} \qquad (2)$$

It can be further shown that a point will be reached at which there are so many processors in the system that the total bit map memory consumes all of the available system memory. This is shown in equation (3), which rearranges equation (1) to set B=M and solve for N:

$$N = 8C(B/M) = 8C \text{ processors} \qquad (3)$$

This means that in a system with C=64-byte cache lines, all available memory would be devoted to the per-processor data structures $28A_1, 28A_2 \ldots 28A_n$ when there are 8*64=512 processors. This is unfortunate given that RCU is used in read-mostly situations, so that the number of bits set for any grace period will often be small. Moreover, if this is a user-level implementation of RCU, the number of threads T may need to be used instead of the number of processors N in the above equations, which will usually result in much greater memory consumption.

One way of reducing the memory required is to have one local cache record data structure 28A shared among a group of processors $4_1, 4_2 \ldots 4_n$. This approach may be advantageous for multi-node systems. By way of example, if there are four processors assigned to a single local cache record data structure 28A, the number of local cache record data structures $28A_1, 28A_2 \ldots 28A_n$ (and hence the memory required by their bit maps) would be reduced by a factor of four. However, a synchronization mechanism (such as a lock) may be needed to serialize each processor's access to the shared local cache record data structure 28A.

Another approach is to use compression techniques. Although there are any number of schemes for compactly representing sets (in this case, sets of cachelines to be flushed), all of them have the shortcoming of being variable length, and all of them have degenerate situations where the amount of memory consumed is far greater than that for the bitmaps. One way to solve this problem is to note that it is always correct (if inefficient) to flush more cachelines than necessary. This insight permits the use of lossy compression techniques on the list of cachelines. One example of a lossy compression technique is to simply pretend that the cachelines are larger than they really are. For example, if a system with 32-byte cache lines was treated as if it had 4096-byte cache lines, the size of the bitmaps decreases by more than two orders of magnitude. Of course, the downside of this approach is that the flush operation can end up flushing up to two orders of magnitude more cache lines than necessary. Another example of a lossy compression technique operates on run-length encoding. A run-length encoding in the present context would comprise a sequence of pairs of integers, where one of the pair is the beginning bit index for the corresponding "run," and the other is the number of bits in the run. For example, the bit string 0xff0000ff would be represented as {0,8}, {24,8}. Lossy compression can be applied to this run-length encoding, resulting in {0,32}. This compression will unnecessarily flush cache lines 8-23, but that will affect only performance, not correctness. Such compression allows a small fixed number of pairs of integers to be allocated, which in turn allows efficient insertion of new bits and efficient scanning. It will be appreciated that there are many other encodings and corresponding compression techniques that may also be used for the local cache record data structures $28A_1, 28A_2 \ldots 28A_n$.

To facilitate the communicate operation, the local cache record data structures $28A_1, 28A_2 \ldots 28A_n$ can be stored at agreed-upon memory addresses that are known by the various the processors $4_1, 4_2 \ldots 4_n$. During the communicate operation, each processor (or processor group) having an associated incoherent cache would consult all the local cache record data structures $28A_1, 28A_2 \ldots 28A_n$ stored at the agreed-upon memory addresses and then use the cacheline information therein to flush their own local cachelines during the flush operation. This of course requires that synchronization be maintained between a given processor (or processor group) updating its local cache record data structure 28A during the record phase and other processors (or processor groups) accessing the same data structure during the communicate phase. Such synchronization may entail a fair amount of overhead.

Figure 6:
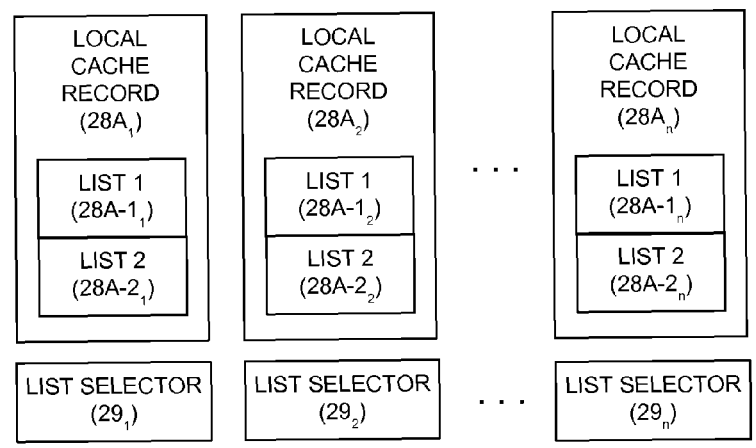
FIG. 6 is a functional block diagram showing an optional aspect of the RCU subsystem of FIG. 5.

One way of managing the foregoing synchronization overhead would be to have each local cache record data structure $28A_1, 28A_2 \ldots 28A_n$ optionally maintain two separate lists of cacheline information. As shown in FIG. 6, a first list 28A-1 could comprise cacheline information that has already been communicated and a second list 28A-2 could be used to accumulate cache lines from ongoing invocations of the record operation. Each processor (or processor group) would then indicate which of its two lists was in effect for the current grace period. This could be done by setting a list selector $29_1, 29_2 \ldots 29_n$ that is maintained in association with each local cache record data structure $28A_1, 28A_2 \ldots 28A_n$. As an optimization, each processor (or processor group) could also indicate whether or not its current list was empty. Given that RCU tends to be used in read-mostly situations, the cacheline information lists 28A-1 and 28A-2 will often be empty, and such an indication can avoid the need for useless scanning of empty lists.

An alternative approach is to have each processor (or processor group) implement the communicate operation by consolidating the cacheline information of its local cache record data structure 28A in a global data structure. For example, whenever a processor 4 begins or acknowledges a new grace period, the communicate sub-component 26B-1 may communicate cacheline information in the local cache record data structure 28A by placing this information in an optional global cache record data structure 28B, as shown in FIG. 5. Each processor (or processor group) may then implement the flush cache component 26B-1 to consult the global cache record data structure 28B use the information therein to flush their local cache(s) before the grace period ends. This approach avoids the $N^2$ complexity of multiple processors (or processor groups) scanning each of the local cache record data structures $28A_1, 28A_2 \ldots 28A_n$ maintained by other processors (or processor groups), but requires a synchronization scheme (e.g., locking) to serialize access to the global cache record data structure 28B.

Hierarchical RCU implementations can mitigate this synchronization overhead in systems having a large number of processors. In hierarchical RCU, a hierarchy of grace period-tracking structures (not shown) is used to record processor quiescent states and track other grace period-related information. Each leaf-position grace period-tracking structure in the hierarchy is shared by a relatively small number of processors to reduce synchronization overhead. When all processors sharing a given leaf-position grace period-tracking structure have recorded a quiescent state, the leaf-position structure merges its own quiescent state information in a branch-position grace period-tracking structure that occupies a next higher level of the hierarchy, and which serves some number of leaf-position structures. Eventually, quiescent states are propagated up through the hierarchy to a root-position grace-period tracking structure, at which point the system may be deemed to have reached a global quiescent state.

In systems implementing hierarchical RCU, the grace-period tracking structure hierarchy can be modified to provide a hierarchy of the cache record data structures 28A (see optional element 28C of FIG. 5). By way of example, the local cache record data structures $28A_1, 28A_2 \ldots 28A_n$ shown in FIG. 5 could be incorporated into or otherwise associated with corresponding leaf-position grace period tracking structures. The cacheline information stored therein could then be periodically merged into one or more successive intermediate levels in the cache record data structure hierarchy 28C and until the cacheline information is passed up the hierarchy and ultimately merged into the global cache record data structure 26B, which could be incorporated into or otherwise associated with a root-position grace period tracking structure. Managing the cacheline information in this manner can greatly reduce synchronization complexity. Synchronization is only needed among the processors sharing a given leaf-position structure and between the leaf-position and branch-position data structures that need to merge their information into higher level data structures in the hierarchy.

Non-hierarchical RCU implementations can gain a similar effect using only the local cache record data structures $28A_1, 28A_2 \ldots 28A_n$ and the global cache record data structure 28B, and by breaking each grace period into two phases. During the first phase, a processor 4 that starts or notices a new grace period may merge cacheline information maintained by its local cache record data structure 28A into the global cache record data structure 28B. Once all of the local cache record data structures $28A_1, 28A_2 \ldots 28A_n$ have been merged, the second phase begins. In the second phase, each processor 4 (or processor group) having an associated incoherent cache may flush its cache as it passes through a quiescent state using the cachelines indicated by the global cache record data structure 28B. Once all of the incoherent caches have been flushed, the grace period can end.

It will be appreciated that various alternative methods may be used for the communicate operation in lieu of the above techniques. For example, techniques that pass messages containing cacheline lists among the various processors (or processor groups) may be used, allowing each processor (or processor group) to build a list of cachelines that need to be flushed. It should be also be noted that user-level implementations of the RCU subsystem 20 may benefit from having updaters 18 use only the global cache record data structure 28B to both record cacheline information and communicate it on an application-wide basis (e.g., to all threads within a given user-level application). In that case, the global cache record data structure 28B could be implemented with a pair of lists (e.g., as shown in FIG. 6), with one list being used for the record/communicate operation and the other list being used for the flush operation during any given grace period.

Example Implementations

First Example Implementation

A first example implementation of the record, communicate and flush operations will now be described with reference to FIGS. 7-11. This implementation assumes there some number of processors $4_1, 4_2 \ldots 4_n$ that each has an associated incoherent cache $10_1, 10_2 \ldots 10_n$. Per-processor local cache record data structures $28A_1, 28A_2 \ldots 28A_n$ are used for the record operation, and a single global cache record data structure 28B is used for the communicate and flush operations. The local record data structures $28A_1, 28A_2 \ldots 28A_n$ are implemented in the manner shown in FIG. 5, with each such data structure being implemented as an array comprising a run-length encoding of cacheline information. As discussed above, the run-length encoding may comprise a set of integer pairs of the form {x,y} in which one integer of each pair is the beginning bit index for the corresponding run and the other integer is the number of bits in the run. A global lock may be used to synchronize access to the global cache record data structure 28B. As shown in FIG. 5, a processor counter 28D and a grace period phase counter 28E are also used. The processor counter 28D keeps track of the number of processors (or processor groups) that need to perform the communicate and flush operations. The phase counter 28E is used to divide grace period processing into separate defined phases.

Figure 7:
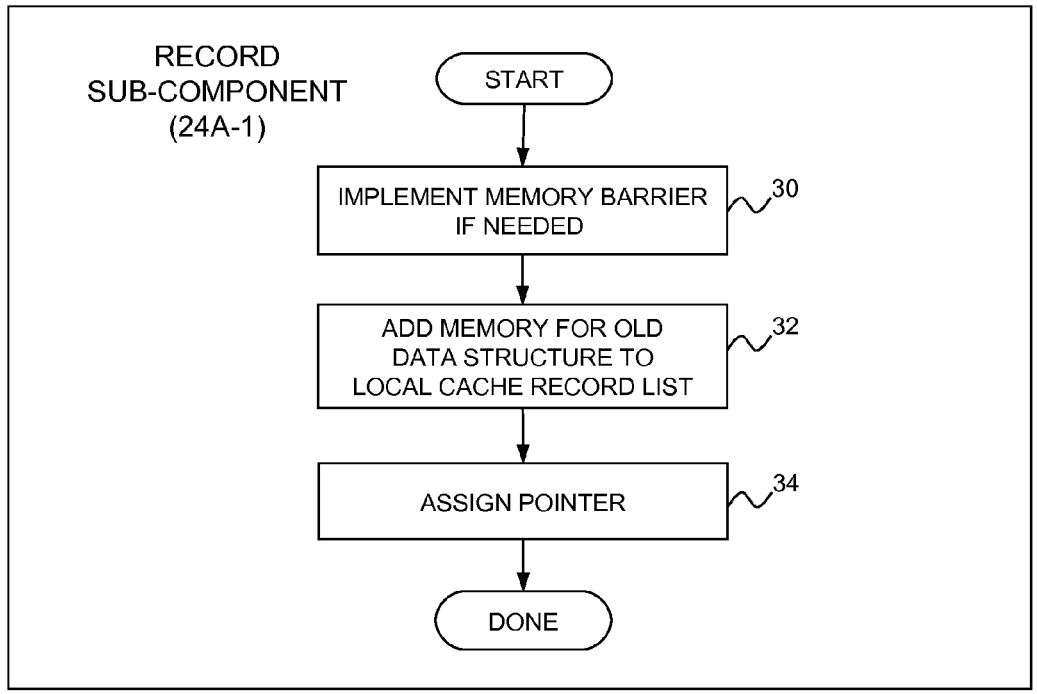
FIG. 7 is a flow diagram showing example operations of a record sub-component of the RCU subsystem of FIG. 5.

In the present example implementation, the record sub-component 24A-1 of FIG. 5 may use a modified version of the rcu_assign_pointer( ) primitive found in existing RCU implementations. In current Linux® versions of RCU, the rcu_assign_pointer( ) primitive is a C language macro whose arguments comprise a first pointer "p" and a second pointer "v." The first pointer p references an existing data structure (e.g. a list element being modified or deleted, or marking the location where a new list element will be inserted). The second pointer v is a new pointer that the updater 18 has allocated and initialized to reference a new or different data structure (e.g., a new list element being inserted in a list, a modified version of an existing list element, or a list element that follows a list element being deleted from a list). FIG. 7 illustrates example operations of the record sub-component 24A-1. Blocks 30 and 34 are found in the existing rcu_assign_pointer( ) primitive, while block 32 is new. In block 30, a write memory barrier instruction (e.g. the smp_wmb( ) barrier primitive used in the Linux® kernel) is conditionally executed if it is necessary to ensure that block 34, which assigns the value of pointer v to pointer p, is seen by other processors as having occurred following the pointer allocation and initialization operations for pointer v that preceded the call to rcu_assign_pointer( ). For example, the memory barrier instruction of block 30 may be needed if pointer v is neither a defined constant (known to the compiler) nor a NULL pointer. Block 32 is unique to the present disclosure. It adds the range of memory for the data structure referenced by pointer p to the run-length encoding in the local cache record data structure 28A assigned to the processor 4 that is performing the update operation, using the value of p as the starting memory address and the C language operator sizeof(*p) to determine the memory extent of the data structure.

Figure 8:
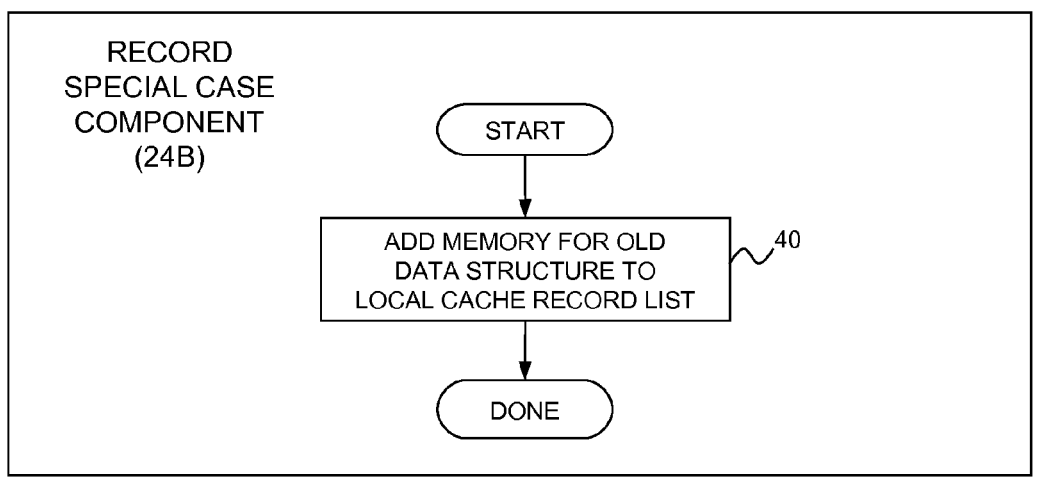
FIG. 8 is a flow diagram showing example operations of a record special case component of the RCU subsystem of FIG. 5.
Figure 9:
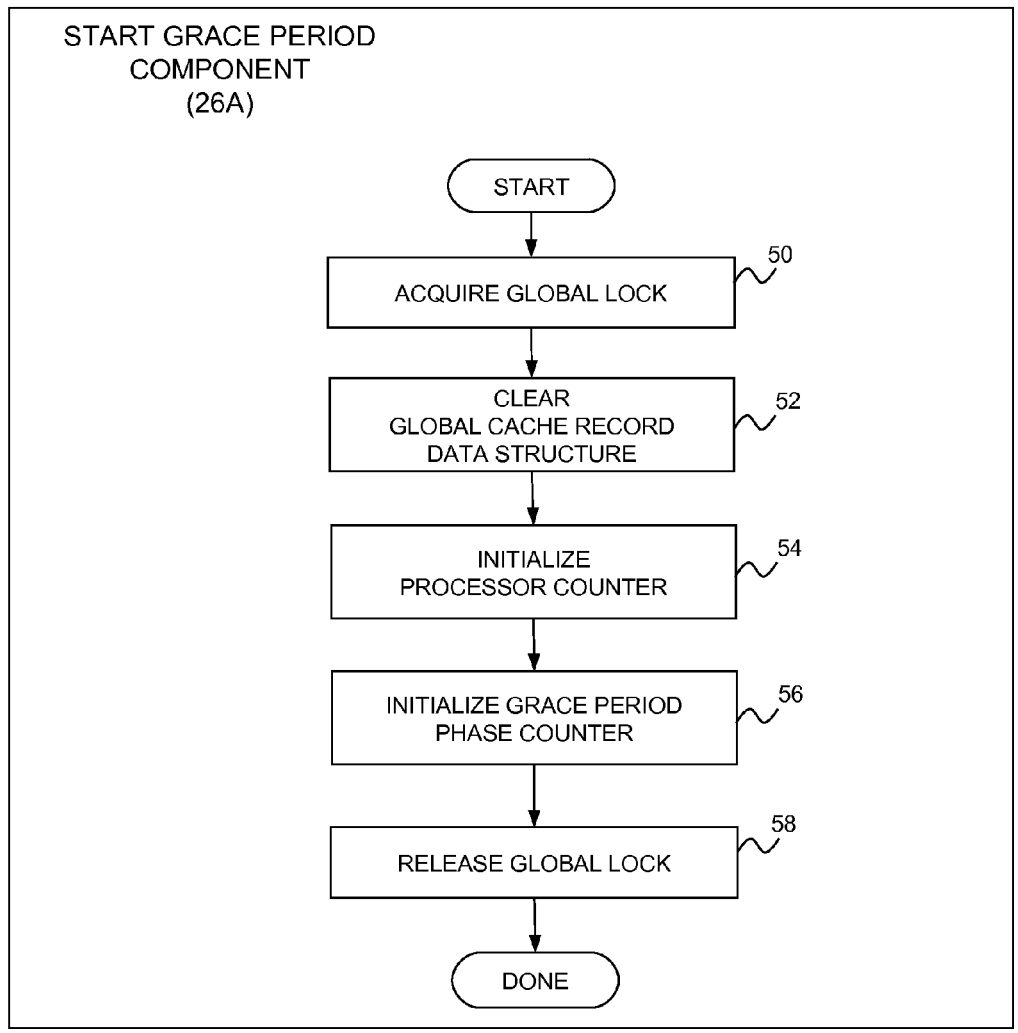
FIG. 9 is flow diagram showing a first example implementation of a start grace period component of the RCU subsystem of FIG. 5.
Figure 10:
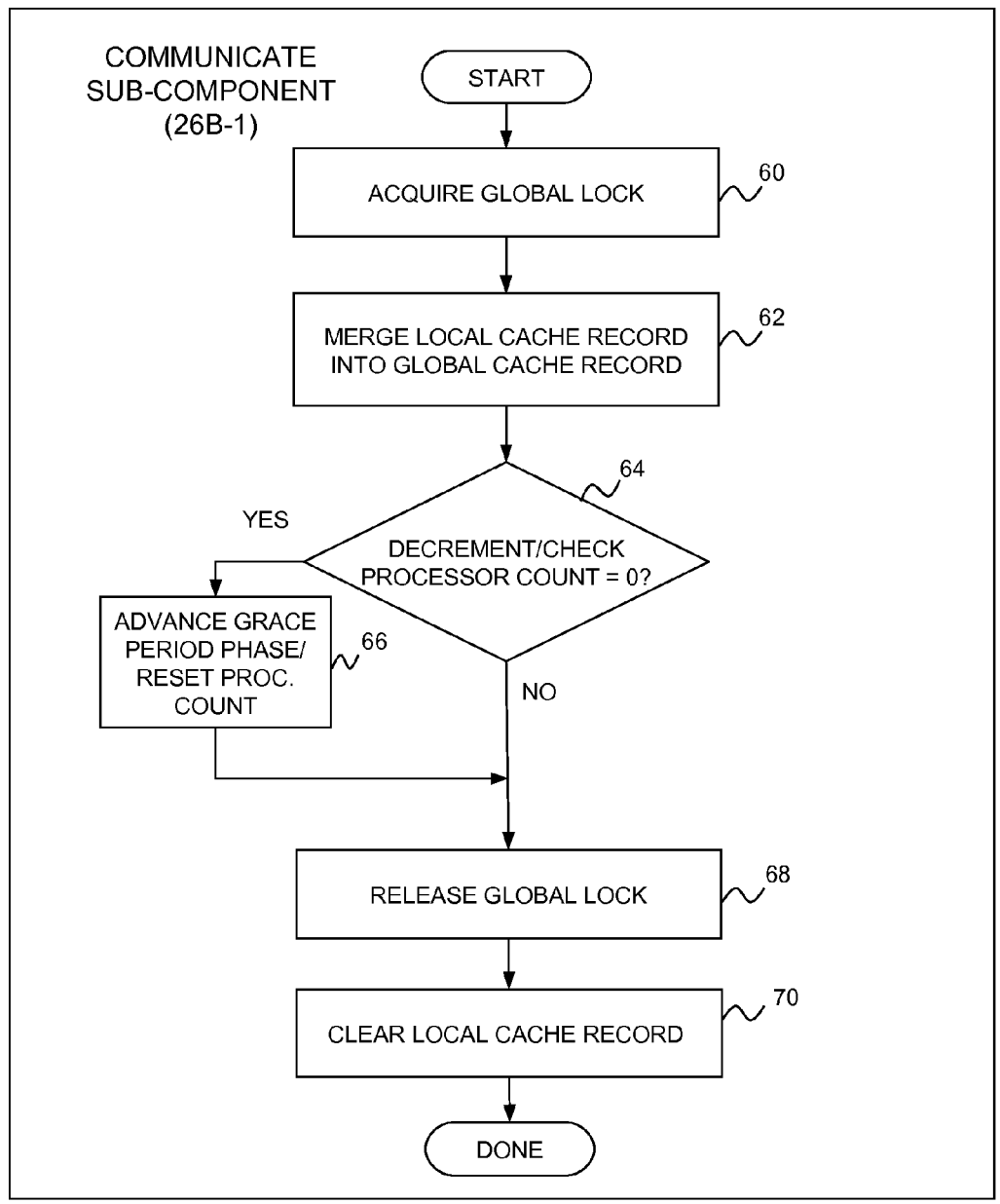
FIG. 10 is a flow diagram showing a first example implementation of a communicate sub-component of the RCU subsystem of FIG. 5.
Figure 11:
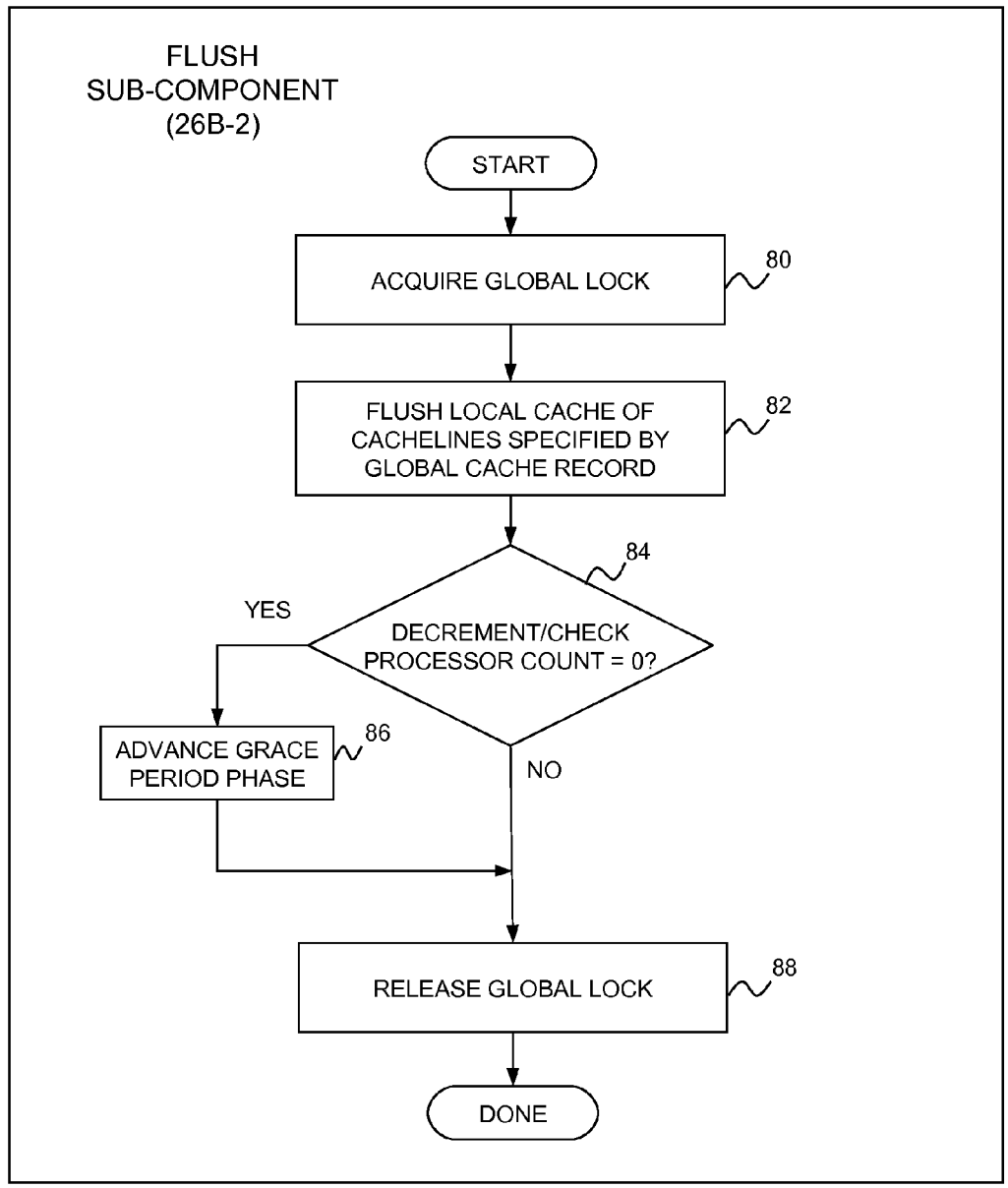
FIG. 11 is a flow diagram showing a first example implementation of a flush sub-component of the RCU subsystem of FIG. 5.

In the present example implementation, the record special case component 24B may perform the single operation shown in block 40 of FIG. 8. It may used in cases where the record sub-component 24A-1 is not able to record the full extent of a data structure that needs to be flushed from cache memory. One example would be where each element of a linked list is itself a linked tree structure. When such a list element is modified, an updater 18 could perform an update operation that ends with an invocation of the record sub-component 24A-1. The updater 18 could then traverse the remaining linked tree structure elements linked to the modified list element, following the pointer to each element, determining its size, and invoking the record special case component 24B to flush such element from cache memory. The record special case component 24B may be implemented as a function whose parameters are "*pp" (the data structure referenced by pointer p) and "size_t s" (the data structure size). Block 40 adds the range of memory for the data structure referenced by pointer p to the appropriate run-length encoding, using the value of p as the starting memory address and the value of s to determine the memory extent of the data structure. Again, the run-length encoding that is updated by block 32 will be in the local cache record data structure 28A assigned to the processor 4 that is performing the update operation.

In the present example implementation, the start grace period component 26A is implemented by the processor 4 that starts a new grace period. This component may perform the operations shown in FIG. 9 in order to initialize the global cache record 28B for use during a new grace period. In block 50, the lock for the global cache record data structure 28B is acquired. Block 52 clears the global cache record data structure 28B, emptying it of all previous run-length encodings. In block 54, the processor counter 28D is initialized to a value representing the total number of processors $4_1, 4_2 \ldots 4_n$ in the system (e.g., the system 2 of FIG. 4). In block 56, the phase counter is initialized to phase 1, which is the phase during which the communicate operations are performed. Block 58 releases the lock for the global cache record data structure 28B.

In the present example implementation, the communicate sub-component 26B-1 is invoked by each processor 4 when it notices that a new grace period has started. This component may perform the operations shown in FIG. 10 to communicate cacheline information from the processor's local cache record data structure 28A to the global cache record data structure 28B. In block 60, the lock for the global cache record data structure 28B is acquired. In block 62, the run-length encoding in the processor's assigned local cache record data structure 28A is merged into the global cache record data structure 28B. In block 64, the processor counter 28D is decremented and tested to see if this is the last processor performing the communicate operation for the current grace period. If it is, block 66 advances the phase counter to phase 2 and resets the processor counter 28D. Following block 66, or if there are more processors that need to invoke the communicate sub-component 26B-1 for this grace period, block 68 is implemented and the lock for the global cache record data structure 28B is released. Block 70 is then performed to clear the local cache record data structure 28A that was just merged into the global cache record data structure 28B.

In the present example implementation, the flush sub-component 26B-2 is invoked by each processor 4 when it has passed through a quiescent state since the beginning of the current grace period and notices that all processors have completed phase 1 of the grace period and phase 2 has been reached (e.g., by checking the phase counter 28E). This component may perform the operations shown in FIG. 11 to flush cachelines identified by the global cache record data structure 28B from the processor's associated incoherent caches. In block 80, the lock for the global cache record data structure 28B is acquired. In block 82, the actual cache flush operation is performed. In block 84, the processor counter 28D is decremented and tested to see if this is the last processor performing the flush operation for the current grace period. If it is, block 86 advances the phase counter to phase 3. Following block 86, or if there are more processors that need to perform the flush operation for this grace period, block 88 is implemented and the lock for the global cache record data structure 28B is released.

At this point, the end grace period sub-component 26B-3 can end the current grace period. Normal callback processing may then be performed by the process callbacks component 26C (if asynchronous grace periods are supported). Updaters 18 using synchronous grace periods may likewise free memory blocks associated with synchronous updates.

Second Example Implementation

A second implementation of the record, communicate and flush operations will now be described with reference to FIGS. 12-17. This implementation assumes the processors $4_1$, $4_2 \ldots 4_n$ are grouped into nodes (or other groupings). As previously discussed, the cache 10 of each processor 4 in a given node may be cache-incoherent or cache-coherent. If per-processor processor caches 10 are coherent, then it is assumed that there is at least one per-node cache that is incoherent (such as the directory cache 17 of FIG. 4A). In this implementation, the processors $4_1$, $4_2 \ldots 4_n$ within a node may share a single local cache record data structure 28A for the record operation. Each processor 4 will access the local cache record data structure 28A when an updater 18 performs the record operation. However, only one processor 4 needs to perform the communicate operation on behalf of the other node processors, thereby acting as a proxy processor with respect to this operation. Insofar as local cache record data structure 28A is accessed by plural processors $4_1$, $4_2 \ldots 4_n$, a synchronization technique is needed to serialize access to this data structure. One technique is to simply use a lock that must be acquired by each processor 4 performing the record operation and by whichever processor is performing the communicate operation. Alternatively, the local cache record data structure 28A could be implemented in the manner shown in FIG. 6, with two cacheline lists 28A-1 and 28A-2. During any give grace period, one cacheline list 28A-1 or 28A-2 would be used by processors $4_1$, $4_2 \ldots 4_n$ that are performing the record operation and the other cacheline list would be used by the processor 4 that performs the communicate operation. The list selector 29 shown in FIG. 6 could be used to identify which cacheline list 28A-1 or 28A-2 is to be used for the record operation. The processor 4 that performs the communicate operation could be responsible for updating the list selector 29 to swap the cacheline lists. A lock would be acquired by each processor 4 that accesses the local cache record data structure 28A. However, the processor 4 that performs the communicate operation could drop the lock after updating the list selector 29 insofar as the communicate operation would be merging one cacheline list 28A-1 or 28A-2 while the record operations are using the other cacheline list.

As shown in FIG. 5, a node counter 28F, a global grace period counter 28G, and a set of per-node grace period counters $28H_1 \ldots 28H_m$ may be used in addition to the grace period phase counter 28E. The processor counter 28D may or may not be needed, as described in more detail below in connection with the flush sub-component 26B-2. The node counter 28D keeps track of the number of nodes that need to perform the communicate and flush operations. The global grace period counter 28E tracks system-wide grace periods and is used determine which processor 4 in a given node will perform the communicate operation. For example, the first node processor 4 to notice the start of a new grace period may act as the node's designated communicator. Each node grace period counter 28H is set on behalf of each node by the processor 4 that performs the communicate operation on behalf of the node. This advises other node processors that the communicate operation has already been performed for the current grace period.

In the present example implementation, the record sub-component 24A-1 may be implemented in the manner shown in FIG. 7, except that block 32 uses the list indicator 29 for the node's local cache record data structure 28A to determine which cacheline list 28A-1 or 28A-2 to use for the record operation. Similarly, the record special case component 24B may be implemented in the manner shown in FIG. 8, except that block 40 will also use the list selector 29 to record cacheline information into the correct cacheline list. The start grace period component 26A, the communicate sub-component 26B-1 and the flush sub-component 26B-2 are all modified for the present implementation, as will now be discussed.

Figure 12:
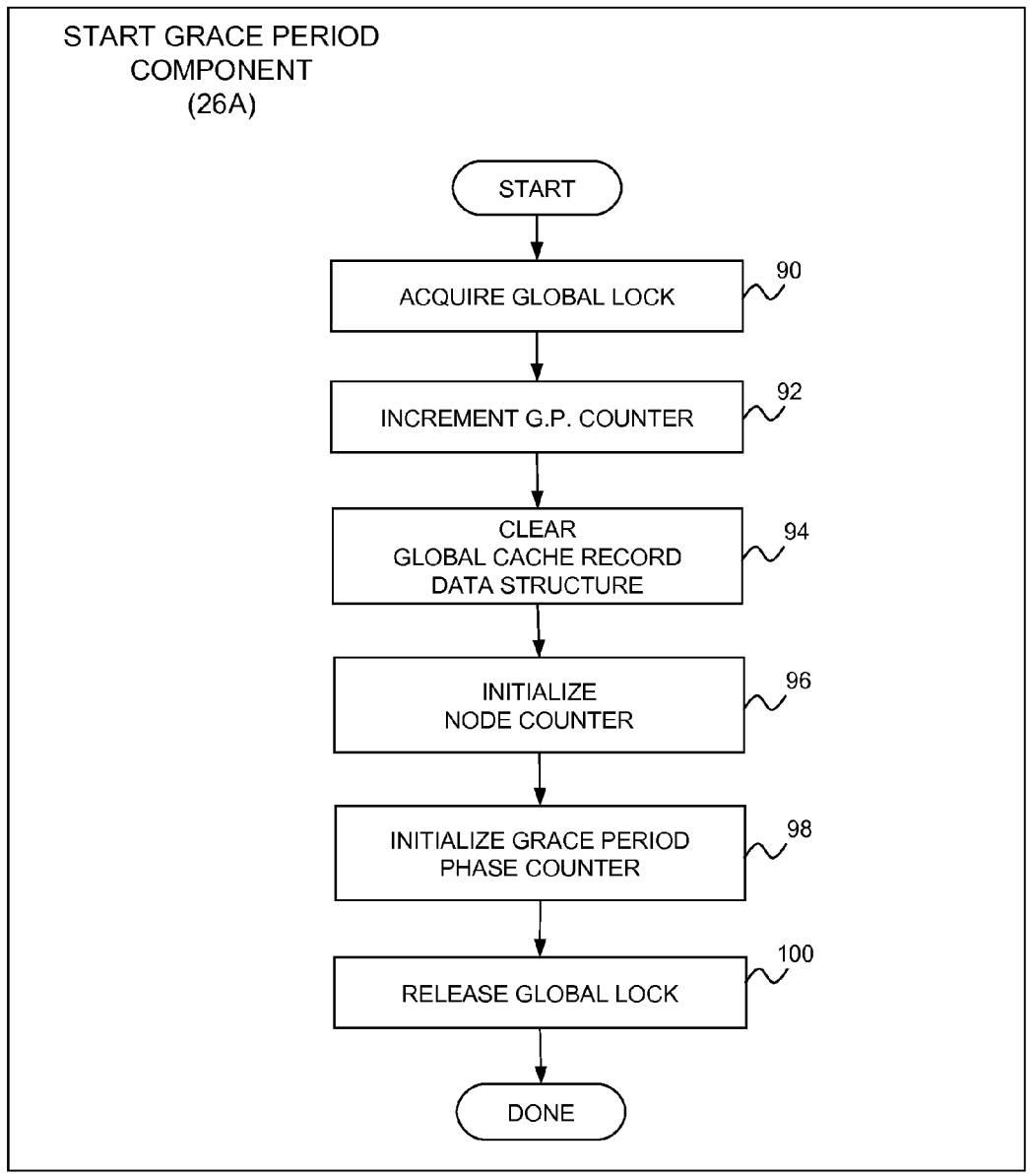
FIG. 12 is flow diagram showing a second example implementation of a start grace period component of the RCU subsystem of FIG. 5.

The start grace period component 26A for the present example implementation may perform the operations shown in FIG. 12. In block 90, the lock for the global cache record data structure 28B is acquired. Block 92 increments the grace period counter 28G and block 94 clears the global cache record data structure 28B, emptying it of all previous run-length encodings. In block 96, the node counter 28F is initialized to a value representing the total number of nodes in the system (e.g., the system 2 of FIG. 4A). In block 98, the phase counter is initialized to phase 1, which is the phase during which the communicate operations are performed. Block 100 releases the lock for the global cache record data structure 28B.

Figure 13:
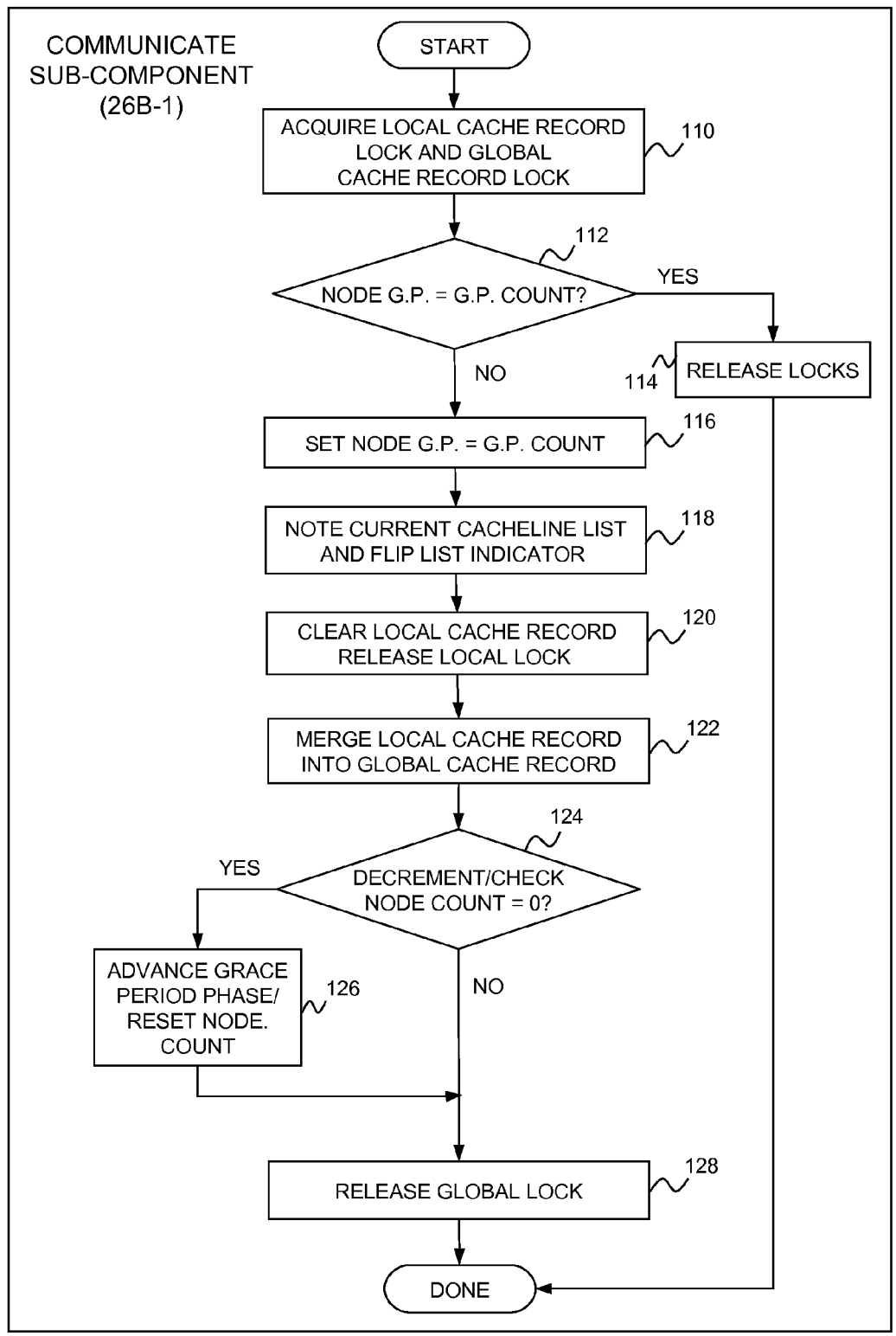
FIG. 13 is a flow diagram showing a second example implementation of a communicate sub-component of the RCU subsystem of FIG. 5.

The communicate sub-component 26B-1 for the present example implementation may perform the operations shown in FIG. 13 to communicate cacheline information from a node's local cache record data structure 28A to the global cache record data structure 28B. In block 110, the locks for the local cache record data structure 28A and the global cache record data structure 28B is acquired. In block 112, a check is made to determine if the node grace period counter 28H has been updated to the same value as the global grace period counter 28G. If it has, then another node processor has already performed the communicate operation and processing can terminate. If the grace period counts are not equal in block 112, it means that the current processor 4 is the first processor to perform the communicate operation for the node. This is indicated in block 116 by setting the node grace period counter 28H equal to the global grace period counter 28G. In block 118, the current cacheline list 28A-1 or 28A-2 of the node's local cache record data structure 28A is noted and the list selector 29 is flipped so that subsequent record operations will start using the other cacheline list. In block 120, the cacheline list 28A-1 or 28A-2 that was noted in block 118 is cleared and the lock for the node's local cache record data structure is released. As stated above, this lock is no longer needed because the record operations are now using the other cacheline list. In block 122, the cacheline list 28A-1 or 28A-2 that was noted in block 118 is merged into the global cache record data structure 28B. In block 124, the node counter 28F is decremented and tested to see if this is the last node performing the communicate operation for the current grace period. If it is, block 126 advances the phase counter to phase 2 and resets the node counter 28F. Following block 126, or if there are more nodes that need to invoke the communicate sub-component 26B-1 for this grace period, block 128 is implemented and the lock for the global cache record data structure 28B is released.

Figure 14:
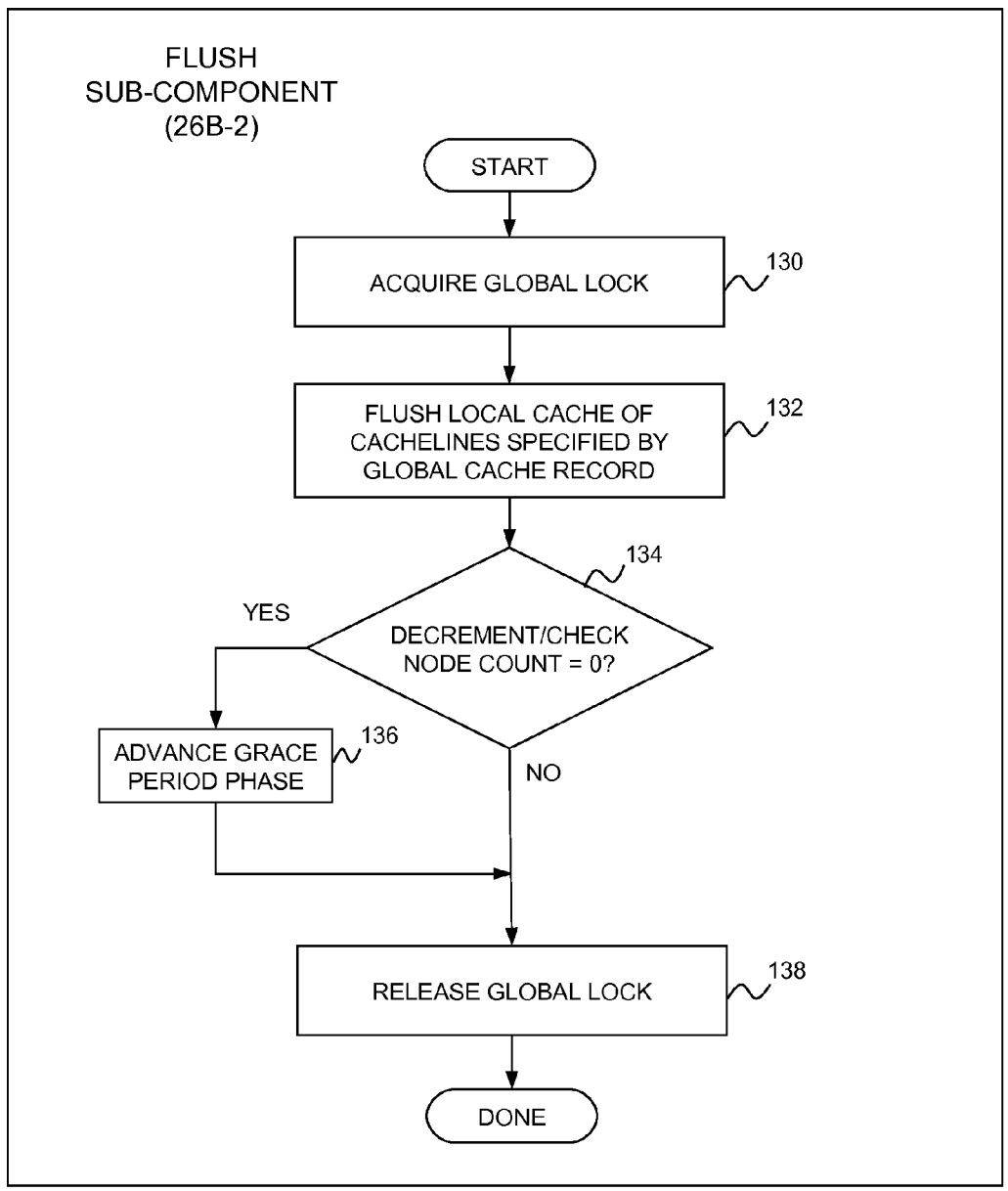
FIG. 14 is a flow diagram showing a second example implementation of a flush sub-component of the RCU subsystem of FIG. 5.
Figure 15:
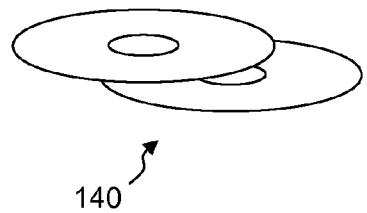
FIG. 15 is a diagrammatic illustration showing example media that may be used to provide a computer program product in accordance with the present disclosure.

The flush sub-component 26B-2 for the present example implementation may perform the operations shown in FIG. 14 to flush cachelines identified by the global cache record data structure 28B from the incoherent cache(s) of each node. In block 130, the lock for the global cache record data structure 28B is acquired. In block 132, the actual cache flush operation is performed. In this implementation, the processor 4 that invokes the flush sub-component 26B-2 may flush its own local cache (if it is non-coherent) and may also act as a proxy processor on behalf of other node processors to clear their caches as well, together with any incoherent directory cache that may be present in the node. For example, if there are multiple processors 4 on a given cache-coherent node, most hardware configurations will permit a given processor to flush all copies of a given cache line from the node, including those held in other processor's caches. One way to handle this would be for a processor to write to the cache line to flush it from the other processor's caches, then execute the instructions required to flush it from its own cache and from all shared caches. In such cases, only one processor in a given node need do any flushing for a given grace period. A shared indicator could be used to allow subsequent processors in the same node to omit cache flushing for the current grace period. For example, a second set of the per-node grace period counters $28H_1 \ldots 28H_m$ could be used for this purpose. Although not shown in FIG. 14, such counters could be manipulated by the first node processor to perform the flush operation on behalf of its node peers using the same processing shown in blocks 112 and 116 of FIG. 13. Returning now to FIG. 14, block 134 decrements the node counter 28F and tests it to see if this is the last node performing the flush operation for the current grace period. If it is, block 136 advances the phase counter to phase 3. Following block 136, or if there are more nodes that need to perform the flush operation for this grace period, block 138 is implemented and the lock for the global cache record data structure 28B is released.

At this point, the end grace period sub-component 26B-3 can end the current grace period. Normal callback processing may then be performed by the process callbacks component 26C (if asynchronous grace periods are supported). Updaters 18 using synchronous grace periods may likewise free memory blocks associated with synchronous updates.

Accordingly, an RCU implementation for non-cache-coherent systems has been disclosed. It will be appreciated that the foregoing concepts may be variously embodied in any of a data processing system, a machine implemented method, and a computer program product in which programming logic is provided by one or more machine-useable storage media for use in controlling a data processing system to perform the required functions. Example embodiments of a data processing system and machine implemented method were previously described in connection with FIGS. 4-14. With respect to a computer program product, digitally encoded program instructions may be stored on one or more computer-readable data storage media for use in controlling a computer or other digital machine or device to perform the required functions. The program instructions may be embodied as machine language code that is ready for loading and execution by the machine apparatus, or the program instructions may comprise a higher level language that can be assembled, compiled or interpreted into machine language. Example languages include, but are not limited to C, C++, assembly, to name but a few. When implemented on a machine comprising a processor, the program instructions combine with the processor to provide a particular machine that operates analogously to specific logic circuits, which themselves could be used to implement the disclosed subject matter.

Example data storage media for storing such program instructions are shown by reference numerals 8 (main memory), 10 (cache memory) and 17 (directory cache) of the system 2 of FIG. 4 and the system 2A of FIG. 4A. The systems 2 and 2A may further include one or more secondary (or tertiary) storage devices (not shown) that could store the program instructions between system reboots. A further example of media that may be used to store the program instructions is shown by reference numeral 140 in FIG. 15. The media 140 are illustrated as being portable optical storage disks of the type that are conventionally used for commercial software sales, such as compact disk-read only memory (CD-ROM) disks, compact disk-read/write (CD-R/W) disks, and digital versatile disks (DVDs). Such media can store the program instructions either alone or in conjunction with an operating system or other software product that incorporates the required functionality. The data storage media could also be provided by portable magnetic storage media (such as floppy disks, flash memory sticks, etc.), or magnetic storage media combined with drive systems (e.g. disk drives). As is the case with the main memory 8 and the caches 10 and 17 of FIGS. 4 and 4A, the storage media may be incorporated in data processing platforms that have integrated random access memory (RAM), read-only memory (ROM) or other semiconductor or solid state memory. More broadly, the storage media could comprise any electronic, magnetic, optical, infrared, semiconductor system or apparatus or device, or any other tangible entity representing a machine, manufacture or composition of matter that can contain, store, communicate, or transport the program instructions for use by or in connection with an instruction execution system, apparatus or device, such as a computer. For all of the above forms of storage media, when the program instructions are loaded into and executed by an instruction execution system, apparatus or device, the resultant programmed system, apparatus or device becomes a particular machine for practicing embodiments of the method(s) and system(s) described herein.

Although various example embodiments have been shown and described, it should be apparent that many variations and alternative embodiments could be implemented in accordance with the disclosure. It is understood, therefore, that the invention is not to be in any way limited except in accordance with the spirit of the appended claims and their equivalents.

What is claimed is:

1. A method for implementing read-copy update in a shared-memory computing system having two or more processors operatively coupled to a shared memory and to associated incoherent caches, said method comprising:

recording cacheline information identifying cachelines containing data that has been rendered obsolete in an incoherent cache associated with one processor of said two or more processors due to a data update being performed by said one processor of said two or more processors;

said incoherent cache caching copies of data stored in said memory without hardware-implemented cache coherency support;

said recording comprising said one processor of said two or more processors storing said cacheline information in a local cache record data structure associated with said one processor of said two or more processors;

communicating said recorded cacheline information to different processors of said two or more processors;

said communicating comprising either said different processors reading said local cache record data structure or said one processor of said two or more processors merging said cacheline information from said local cache record data structure into a global cache record data structure that stores cacheline information merged from two or more local cache record data structures associated with different processors, said cacheline information being merged either directly into said global cache record data structure or through a hierarchy comprising one or more levels of intermediate cache record data structures; and using said communicated cacheline information to identify cachelines that contain said obsolete data in incoherent caches associated with said different processors and flush said obsolete data from said identified cachelines.

2. The method of claim 1, wherein said recording comprises an updater determining a memory address extent of said obsolete data in said memory during said data update to identify said cachelines that hold said obsolete data, and storing said cacheline information during said update in a local cache record data structure associated with a processor that is performing said recording.

3. The method of claim 1, wherein said recording comprises an updater determining a memory address extent of said obsolete data in said memory during said data update to identify said cachelines that hold said obsolete data, and storing said cacheline information following said update in a local cache record data structure associated with a processor that is performing said recording.

4. The method of claim 1, wherein a compression storage technique to record said cacheline information.

5. The method of claim 1, wherein said flushing comprises using said cacheline information stored in said local cache record data structure or said global cache record data structure to identify and flush said obsolete data from said incoherent caches.

6. The method of claim 1, wherein said communicating and said flushing are respectively performed during first and second grace period phases by each of said two or more processors or by one or more proxy processors of said two or more processors that perform said operations on behalf of said different processors.

* * * * *